(12) United States Patent
Mizoguchi et al.

(10) Patent No.: US 6,546,131 B1
(45) Date of Patent: *Apr. 8, 2003

(54) IMAGE PROCESSING METHOD AND APPARATUS FOR ACHIEVING TONE REPRODUCTION SUITED TO THE IMAGE

(75) Inventors: Yoshito Mizoguchi, Yokohama (JP); Sono Gu, Omiya (JP); Satoru Fukushima, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 421 days.

(21) Appl. No.: 08/440,879

(22) Filed: May 15, 1995

Related U.S. Application Data

(63) Continuation of application No. 07/807,216, filed on Dec. 16, 1991, now abandoned.

(30) Foreign Application Priority Data

Dec. 19, 1990 (JP) .............................. 2-403855
Jan. 29, 1991 (JP) .............................. 3-009246

(51) Int. Cl.⁷ .............................................. G03F 3/08
(52) U.S. Cl. ...................... 382/167; 358/504; 358/520; 358/522; 358/523
(58) Field of Search ................................ 358/518, 520, 358/522, 523, 524, 504, 447, 448, 445, 455, 461, 517, 519; 382/167, 169, 131, 132, 168; 348/396, 450, 97

(56) References Cited

U.S. PATENT DOCUMENTS

| | | | | |
|---|---|---|---|---|
| 4,335,399 A | * | 6/1982 | Matsumoto | 358/80 |
| 4,472,736 A | * | 9/1984 | Ushio et al. | 358/518 |
| 4,489,349 A | * | 12/1984 | Okada | 358/32 |
| 4,578,712 A | * | 3/1986 | Matsunawa | 382/51 |
| 4,636,845 A | * | 1/1987 | Alkofer | 358/522 |
| 4,642,683 A | * | 2/1987 | Alkofer | 358/522 |
| 4,642,684 A | * | 2/1987 | Alkofer | 358/522 |
| 4,663,663 A | * | 5/1987 | Lee | 358/422 |
| 4,667,228 A | | 5/1987 | Kawamura et al. | 358/80 |

(List continued on next page.)

FOREIGN PATENT DOCUMENTS

| | | | | |
|---|---|---|---|---|
| JP | 61-45676 | 3/1986 | ............ | H04N/1/40 |
| JP | 63-35075 | 2/1988 | ............ | H04N/1/46 |
| JP | 63-139481 | 6/1988 | ............ | H04N/1/40 |
| JP | 63-155867 | 6/1988 | ............ | H04N/1/40 |
| JP | 64-24690 | 1/1990 | ............ | H04N/9/11 |
| JP | 2-294163 | 12/1990 | ............ | H04N/1/40 |
| JP | 4-119765 | 4/1992 | ............ | H04N/1/40 |

*Primary Examiner*—Cheukfan Lee
(74) *Attorney, Agent, or Firm*—Fitzpatrick, Cella, Harper & Scinto

(57) ABSTRACT

Digital image data corresponding to an original read in by a CCD is stored in a page memory in pixel units, and a CPU reads the stored image data and creates a histogram. For an original having many high-density portions, an image is formed using a LOG conversion table which generates density data that enables reproduction of the tonality of the high-density portions. For an original which is comparatively faint, an image is formed using a LOG conversion table which generates density data that assures tone reproduction up to the maximum density of the original even if high-density portions cannot be reproduced. As a result, tone reproduction suited to the original image can be realized at all times.

12 Claims, 30 Drawing Sheets

| COMPARISON OF MAGENTA AND YELLOW<br>COMPARISON OF MAGENTA AND CYAN | S22 | S23 |
|---|---|---|
| S25 | COLORS ARE DISTRIBUTED TO THE SAME EXTENT OR THERE IS A GRAY DISTRIBUTION IN THE ORIGINAL | THERE IS A LARGE YELLOW DISTRIBUTION IN THE ORIGINAL |
| S26 | THERE IS A LARGE RED DISTRIBUTION IN THE ORIGINAL | THERE IS A LARGE YELLOW AND RED DISTRIBUTION IN THE ORIGINAL |

U.S. PATENT DOCUMENTS

| | | | | |
|---|---|---|---|---|
| 4,677,645 A | * | 6/1987 | Alkofer | 358/522 |
| 4,727,434 A | * | 2/1988 | Kawamura | 358/522 |
| 4,731,671 A | * | 3/1988 | Alkofer | 358/522 |
| 4,745,465 A | * | 5/1988 | Kwon | 358/522 |
| 4,837,450 A | | 6/1989 | Satomura et al. | 250/571 |
| 4,891,692 A | * | 1/1990 | Outa | 358/522 |
| 4,903,145 A | | 2/1990 | Funada | 358/462 |
| 4,907,286 A | | 3/1990 | Yamada | 382/51 |
| 4,920,411 A | * | 4/1990 | Miyakawa | 358/523 |
| 4,931,864 A | | 6/1990 | Kawamura et al. | 358/80 |
| 4,954,889 A | * | 9/1990 | Endo | 358/523 |
| 4,969,053 A | * | 11/1990 | Outa et al. | 358/458 |
| 4,984,071 A | * | 1/1991 | Yonezawa | 358/522 |
| 5,055,944 A | * | 10/1991 | Shibahara | 358/447 |
| 5,065,257 A | | 11/1991 | Yamada | 358/463 |
| 5,086,486 A | | 2/1992 | Yamada | 382/53 |
| 5,132,788 A | * | 7/1992 | Hirota | 358/518 |
| 5,157,518 A | * | 10/1992 | Ohtaki et al. | 358/443 |
| 5,172,419 A | * | 12/1992 | Manian | 382/131 |
| 5,177,602 A | * | 1/1993 | Fujimori | 358/522 |
| 5,185,668 A | | 2/1993 | Ohta | 358/445 |
| 5,222,154 A | * | 6/1993 | Graham et al. | 382/168 |
| 5,224,177 A | * | 6/1993 | Doi et al. | 382/168 |
| 5,237,400 A | * | 8/1993 | Washio et al. | 358/518 |
| 5,278,641 A | * | 1/1994 | Sekizawa et al. | 382/168 |
| 5,278,921 A | * | 1/1994 | Nakamura et al. | 382/167 |
| 5,282,046 A | * | 1/1994 | Yamaguchi | 358/518 |
| 5,295,202 A | * | 3/1994 | Steinkirchner et al. | 382/168 |
| 5,347,374 A | * | 9/1994 | Fuss et al. | 382/168 |
| 5,408,343 A | * | 4/1995 | Sugiura et al. | 358/518 |
| 5,495,428 A | * | 2/1996 | Schwartz | 358/518 |
| 5,594,558 A | | 1/1997 | Usami et al. | 358/518 |

* cited by examiner

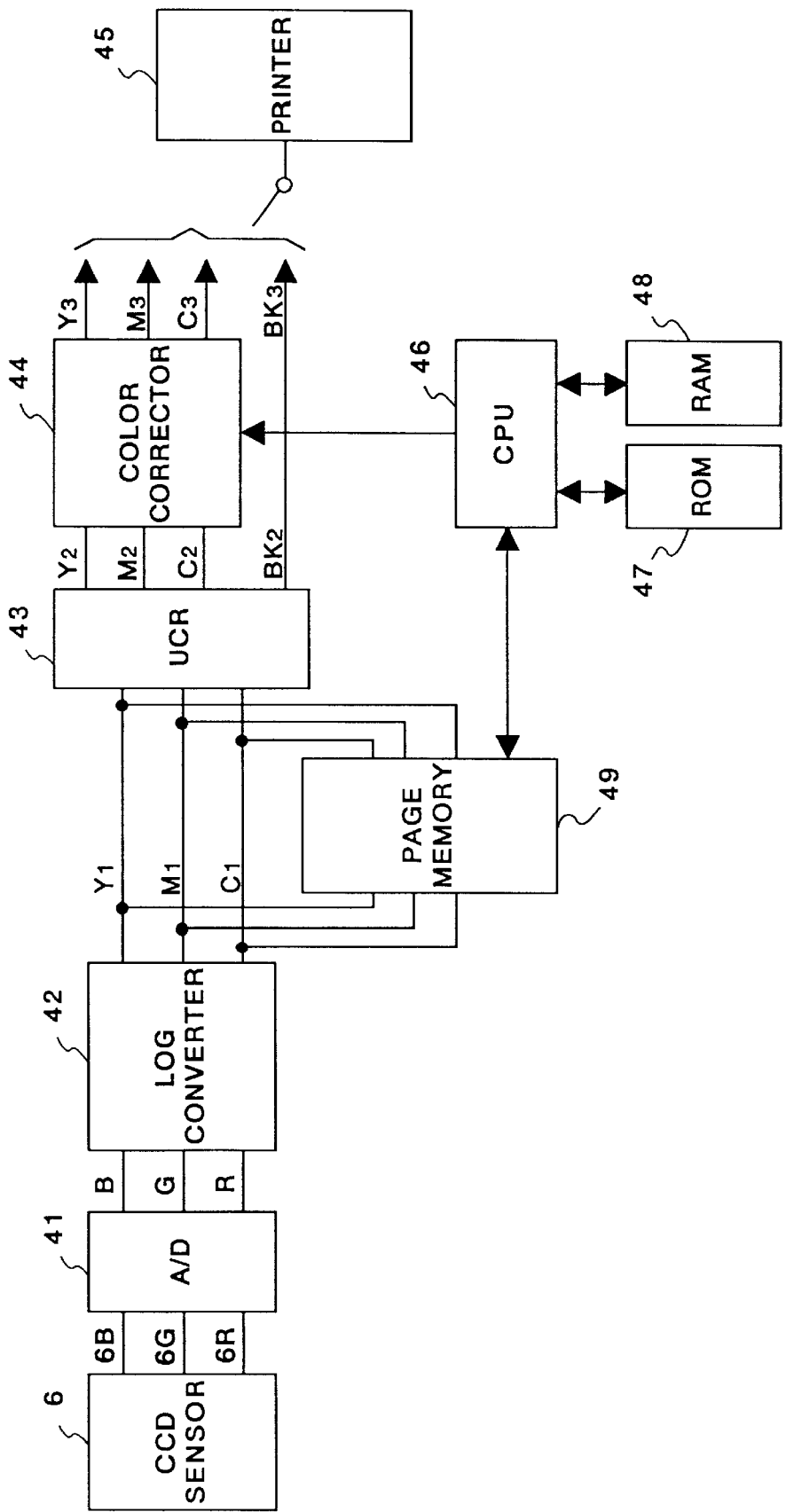
F I G. 17

| COMPARISON OF MAGENTA AND YELLOW / COMPARISON OF MAGENTA AND CYAN | S22 | S23 |
|---|---|---|
|  | COLORS ARE DISTRIBUTED TO THE SAME EXTENT OR THERE IS A GRAY DISTRIBUTION IN THE ORIGINAL | THERE IS A LARGE YELLOW DISTRIBUTION IN THE ORIGINAL |
| S25 | | |
| S26 | THERE IS A LARGE RED DISTRIBUTION IN THE ORIGINAL | THERE IS A LARGE YELLOW AND RED DISTRIBUTION IN THE ORIGINAL |

FIG. 20

|  | S22 | S23 |
|---|---|---|
| S25 | TYPE 0 | TYPE 1 |
| S26 | TYPE 6 | $\frac{\text{TYPE 1} + \text{TYPE 6}}{2}$ |

F I G. 21

IMAGE PROCESSING METHOD AND APPARATUS FOR ACHIEVING TONE REPRODUCTION SUITED TO THE IMAGE

This application is a continuation, of application Ser. No. 07/807,216 filed Dec. 16, 1991, now abandoned.

BACKGROUND OF THE INVENTION

1. Field of the Invention

This invention relates to an image processing apparatus for reproducing half-tones, for example, a color-image processing apparatus having a color correcting function, and an image processing method implemented by these apparatus.

2. Description of the Prior Art

A copying apparatus equipped with a laser-beam printer is well known as an apparatus of the above-mentioned kind. The operation performed within the laser-beam printer involves pulse-width modulating an image signal by means of a reference signal (e.g., a triangular-wave signal) and reproducing tones by making the obtained pulse width correspond to laser emission time.

The use of full-color images has recently increased not only in the printing and design fields but also in the office, and this has been accompanied by the popularization of color copying apparatus which faithfully read and output color images. Here also it is well-known to employ the aforementioned pulse-width modulated laser-beam printer in order to faithfully reproduce color tones.

FIG. 1 is a simplified view showing the construction of an image reading section. Shown in FIG. 1 are an original 1, a platen 2 on which the original 1 is placed, a lamp 3 for illuminating the original 1, an imaging element array 4, an infrared cutting filter 5, a contact-type CCD sensor (hereinafter referred to simply as a "CCD") 6, and an optical unit 7 which holds the lamp 3, imaging element array 4, filter 5 and CCD 6.

The above-described arrangement is so adapted that when a copy key (not shown) is pressed, the lamp 3 illuminates the original 1 and light reflected from the original 1 is imaged on the CCD 6 through the imaging element array 4 and infrared cutting filter 5.

The optical unit 7 is scanned in the direction of the arrow, and electrical signals of main and subordinate scans are produced by the CCD 6 and sent to a signal processing circuit shown in FIGS. 2A and 2B.

FIGS. 2A and 2B are block diagrams illustrating the construction of an image forming apparatus. A signal from the CCD 6 is amplified by an amplifier 8, and the amplified signal is converted into digital image data by an A/D converting circuit 9. The resulting data is converted into image (density) data by a LOG converter circuit 29, the data is then subjected to various types of image processing by an image processing circuit 30, and the processed digital data is fed into a D/A converter 14, where the digital signal is converted back into an analog signal. The analog signal is applied to a comparator 16, where the signal is pulse-width modulated by being compared with a signal of a predetermined period generated by a triangular-wave generating circuit 15. This pulse-width modulated binarized image signal is fed into a laser driving circuit 17 (FIG. 2B) in order to be used as a signal for on/off control of an emission from a laser diode 18. The laser light emitted by the laser diode 18 is made to scan in the main scanning direction by a well-known polygon mirror 19 an f/θ lens 20 and a reflecting mirror 21 so as to irradiate a photosensitive drum 22, which serves as an image carrier rotating in the direction of the arrow, An electrostatic latent image is thus formed on the drum 22.

After the photosensitive drum 22 is uniformly de-electrified by an exposing device 28, it is uniformly electrified to a minus charge by a corona charging device 23. Thereafter, the drum 22 is acted upon by the laser light so that an electrostatic latent image conforming to the image signal is formed on its surface. A so-called image scanning method, in which the portions (black pixels) that undergo development are exposed, is one type of a developing method often used by a laser-beam printer. By means of a well-known reverse developing method, a developing device 24 causes a toner having a negative electrification characteristic to adhere to the portion of the photosensitive drum 22 de-electrified by the laser, thereby forming an image.

The developed image (the toner image having a negative charge) formed on the photosensitive drum 22 by the above-described method is transferred to a transfer material (generally paper) 26 by a transfer corona charging device 25. The visible toner image transferred to the transfer material 26 is then fixed by a fixing device (not shown). Residual toner left on the photosensitive drum is subsequently scraped off by a cleaner 27, after which the process described above is repeated.

In the image forming apparatus described above, conventionally the LOG converter circuit 29 performs a digital conversion by a look-up table method. For example, two types of look-up tables are provided and a changeover is made between a character mode and a photograph mode. An inconvenience encountered in the above-described prior art is that the changeover of the LOG conversion tables for deciding output density must be performed manually by an operator, who makes the changeover upon looking at the original. In the case of an original that is a photograph, maximum density differs greatly depending upon whether the original is a silver chloride photograph or printed matter.

Even silver chloride photographs are of various types, such as photographs that are bright overall and photographs that are dark and have almost no high density. Selecting the mode in each of these instances is difficult.

Furthermore, in a case where the appropriate LOG conversion table has been selected, the following problem can arise:

When a bright photographic original having many portions of a reflective density of 1.7–2.0 or greater is processed by a table of LOG 1.7 (in which reproduction is possible from a density of 0.05 to 1.7), tone reproduction of the portions having a density greater than 1.7 is impossible. Conversely, when LOG 1.7 is selected in case of a faint original whose maximum density is on the order of 1.0, the maximum copy density falls below 1.0 and an image having an overall faint density results.

In a case where a copied image is used as an original to produce another copy which is then copied in the same manner, the foregoing problem becomes more pronounced with each generation of such copies and picture quality deteriorates markedly.

Though a variety of color-image forming apparatus are known, those in widest use employ a laser printer in which image exposure on a photosensitive body is performed by laser light and the image is developed to obtain a visible image. Such a laser printer exhibits the advantages of high picture quality and speed and is widely employed as the output unit of a color copier or as an ordinary printer.

A color-image forming apparatus will now be described with reference to FIGS. 1, 3 and 4.

First, the process for reading a color original will be described. When a copy key (not shown) is pressed, the lamp 3 (FIG. 1) illuminates the original 1 and light reflected from the original 1 is imaged on the CCD 6 through the imaging element array 4 and infrared cutting filter 5, thereby forming an image of the original on the CCD 6. The optical unit 7 is made to scan the original 1 successively in the direction of the arrow. As shown in FIG. 3, filters for red (R), green (G) and blue (B) are correctly mounted on the CCD 6 for each and every pixel. As the original is scanned, electrical signals from the CCD 6 are processed by a signal processing circuit shown in FIG. 4.

In FIG. 4, 6B, 6G, 6R represent signals from each of the B, G, R elements on thee CCD 6 shown in FIG. 3. The R, G, B signals are applied to an A/D converter circuit 41 and a LOG converter circuit 42, whereby these signals are converted into signals $Y_1$, $M_1$, $C_1$ of digital form. The signals $Y_1$, $M_1$, $C_1$ are introduced to a circuit 43, which performs black extraction and UCR (under-color rejection) to produce signals $Y_2$, $M_2$, $C_2$, $Bk_2$ by processing expressed by the following equations:

$$Y_2 = Y_1 - k_3(Y_1, M_1, C_1)_{min}$$

$$M_2 = M_1 - k_3(Y_1, M_1, C_1)_{min}$$

$$C_2 = C_1 - k_3(Y_1, M_1, C_1)_{min}$$

$$Bk_2 = k_1(Y_1, M_1, C_1)_{min} + k_2$$

Here $(Y_1, M_1, C_1)$min represents the minimum of each of the signals $Y_1$, $M_1$, $C_1$, and $k_1$, $k_2$, $k_3$ represent coefficients. The $Y_2$, $M_2$, $C_2$ signals are introduced to a color separating filter of the CCD 6 and to a color corrector circuit 44 in order to correct the spectral distribution of the colorants used in in a printer. The color correcting circuit 44 performs the processing indicated by the following equation:

$$\begin{bmatrix} Y_3 \\ M_3 \\ C_3 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y_2 \\ M_2 \\ C_2 \end{bmatrix}$$

In the above equation, $a_{11}$–$a_{33}$ represent masking coefficients for color correction. The coefficients $k_1$–$k_3$ and $a_{11}$–$a_{33}$ are stored in a ROM (a read-only memory). When copying has started, these coefficients are set in the circuits 43 and 44 by a CPU (central processing unit).

Signals $Y_3$, $M_3$, $C_3$, $Bk_3$, which are the result of processing by the circuit 44, are developed by color-image forming means (printer 45), such as a color thermal-transfer printer, color ink-jet printer or color laser printer. When a laser printer is used as the means for developing the image, the image is formed by so-called pulse-width modulation, namely modulation in which the emission time of the laser is made to correspond to the size of the image signal.

The above-mentioned masking coefficients of the color correcting means are decided by a processing procedure such as described below.

First, a standard color original whose chromaticity coordinates are evident is read by the optical unit 7 shown in FIG. 1, and the masking coefficients are decided by the method of least squares, shown below, in such a manner that the $Y_3$, $M_3$, $C_3$, $Bk_3$ signals from the color corrector circuit 14 illustrated in FIG. 4 are placed in the above-mentioned chromaticity coordinates.

Let Y', M', C' ($Y_2$, $M_2$, $C_2$ of FIG. 4) represent the signals for a standard color original of one color, and let Y, M, C represent chromaticity components serving as target values. In such case, respective color offsets $\Delta_Y$, $\Delta_M$, $\Delta_C$ from the target values are as expressed by the following equations:

$$\Delta_Y = a_{11}Y' + a_{12}M' + a_{13}C' - Y$$

$$\Delta_M = a_{21}Y' + a_{22}M' + a_{23}C' - M$$

$$\Delta_C = a_{31}Y' + a_{32}M' + a_{33}C' - M$$

This is carried out for standard color originals of 20 colors of the kind shown in FIGS. 5A, 5B, 5C, by way of example, and the method of least squares is applied so as to minimize the offsets.

Let $\phi_Y$, $\phi_M$ and $\phi_C$ represent the evaluation functions of yellow, magenta and cyan, respectively. For the color yellow, $\phi_Y$ is the sum of the squares of $\Delta_Y$ with regard to 20 colors. This is expressed as follows:

$$\Phi Y = \sum_{i=1}^{20} \Delta Y_i^2 = \sum_{i=1}^{20} (a_{11}Y_i' + a_{12}M_i' + a_{13}C_i' - Y_i)^2$$

where $Y_i'$, $M_i'$ and $C_i'$ represent signals for an i-th standard color original, and $Y_i$ represents the target value of yellow from among the color components of the i-th standard color original.

Since the coefficients are determined in such a manner that the partial differential of the above-mentioned evaluation functions will be zero, the following results:

$$\frac{\partial \Phi Y}{\partial a_{11}} = 2\{(\Sigma Y_i' Y_i')a_{11} + (\Sigma M_i' Y_i')a_{12} + (\Sigma C_i' Y_i')a_{13} - (\Sigma Y_i Y_i')\} = 0$$

$$\frac{\partial \Phi Y}{\partial a_{12}} = 2\{(\Sigma Y_i' M_i')a_{11} + (\Sigma M_i' M_i')a_{12} + (\Sigma C_i' M_i')a_{13} - (\Sigma Y_i M_i')\} = 0$$

$$\frac{\partial \Phi Y}{\partial a_{13}} = 2\{(\Sigma Y_i' C_i')a_{11} + (\Sigma M_i' C_i')a_{12} + (\Sigma C_i' C_i')a_{13} - (\Sigma Y_i C_i')\} = 0$$

Similarly, the coefficients are decided in such a manner that the partial differential for the evaluation functions of magenta and cyan will also be zero. As a result of the foregoing, the following equations are obtained:

$$\begin{bmatrix} \Sigma Y_i' Y_i' & \Sigma M_i' Y_i' & \Sigma C_i' Y_i' \\ \Sigma M_i' M_i' & \Sigma M_i' M_i' & \Sigma C_i' M_i' \\ \Sigma Y_i' C_i' & \Sigma M_i' C_i' & \Sigma C_i' C_i' \end{bmatrix} \begin{bmatrix} a_{11} & a_{12} & a_{13} \\ a_{21} & a_{22} & a_{23} \\ a_{31} & a_{32} & a_{33} \end{bmatrix} = \begin{bmatrix} \Sigma Y_i' Y_i & \Sigma M_i' Y_i & \Sigma C_i' Y_i \\ \Sigma M_i' M_i & \Sigma M_i' M_i & \Sigma C_i' M_i \\ \Sigma Y_i' C_i & \Sigma M_i' C_i & \Sigma C_i' C_i \end{bmatrix}$$

Expressing the above equation in the form [C] [A]=[D], results in [A]=[C$^{-1}$][D], and the coefficients a11–a33 are found. It should be noted that [C$^{-1}$] is the inverse matrix of [C].

The masking coefficients thus decided are stored beforehand in a ROM and a color reproduction of the original is made upon applying a color correction using these masking coefficients.

Color reproduction as performed in the example of the prior art described above has the following drawbacks:

In a case where the masking coefficients are decided by the method of least squares, the following is obtained with regard to the yellow evaluation function, by way of example:

$$\Phi Y = \sum_{i=1}^{20} \Delta_{Yi}^2$$
$$= \Delta_{Y1}^2 + \Delta_{Y2}^2 + \ldots + \Delta_{Y20}^2$$
$$= (a_{11}Y_1' + a_{12}M_1' + a_{13}C_1' - Y_1)^2 +$$
$$(a_{11}Y_2' + a_{12}M_2' + a_{13}C_2' - Y_2)^2 + \ldots +$$
$$(a_{11}Y_{20}' + a_{12}M_{20}' + a_{13}C_{20}' - Y_{20})^2$$

The first term in the above equation is the error in chromaticity in a case where the first color in FIG. 5A is reproduced, and the last term is the error in chromaticity in a case where the 20th color in FIG. 5C is reproduced. Since squared errors are added at the same weighting with regard to the chromaticity errors of the 1st through 20th colors, the masking coefficients that are finally created are such that the average of the reproducibility errors of each of the colors is minimized. Accordingly, when color reproduction is carried out using these masking coefficients, each color of the original always acquires a certain error from the chromaticity and is reproduced in the manner shown in FIG. 6. Consequently, when an original having many colors inclining to a specific color, say, an original having many colors of green family is reproduced, reproduction is always performed with the aforementioned error and, depending upon the image, an image exhibiting good color reproduction cannot always be obtained.

Image processing using a histogram of an original has been proposed in U.S. Pat. No. 4,667,228, U.S. Pat. No. 4,931,864, U.S. Ser. No. 775,013, U.S. Ser. No. 839,717, U.S. Pat. No. 4,907,286, U.S. Pat. No. 4,837,450, U.S. Pat. No. 4,903,145, and U.S. Ser. No. 592,334. Especially U.S. Pat. No. 4,667,228 and U.S. Pat. No. 4,931,864 disclose gamma correction for each of the color components based upon a histogram of an original.

Yet U.S. Pat. No. 4,667,228 and U.S. Pat. No. 4,931,864 each have a drawback that color balance as a whole is unbalanced, as correction coefficients are set for each of the color components. These prior art patents also have a drawback in that the dynamic range of input signals cannot be fully used, since the signals to be corrected are produced by an arithmetic operation using a plurality of color component signals.

SUMMARY OF THE INVENTION

Accordingly, an object of the present invention is to provide an image processing apparatus capable of achieving tone reproduction suited to the image.

According to the present invention, the foregoing object is attained by providing an image processing apparatus for converting luminance information based upon an original image into density information and outputting a signal for image formation, comprising generating means for generating luminance information of the original image, and creating means for creating a frequency distribution based upon the luminance information generated by the generating means, wherein processing coefficients of the conversion which convert luminance information into density information are controlled, depending upon the distribution state of the frequency distribution.

Another object of the present invention is to provide a color-image forming apparatus capable of improving color reproducibility of widely distributed colors in the image of an original, thereby making it possible to obtain an image having excellent shades.

According to the present invention, the foregoing object is attained by providing a color-image processing apparatus for outputting signals for a color image after applying a color correction to an original image input thereto, comprising of a generating means for generating color information of the plurality of color component signals, and arithmetic means for creating a frequency distribution based upon the color information from the generating means, wherein a color image is formed upon deciding processing coefficients of the color correction by an arithmetic function using the plurality of color components depending upon the distribution state of the frequency distribution.

Another object of the present invention is to improve an image processing method based upon a histogram of an original.

Furthermore, an object of the present invention is to economize the memory.

Another object of the present invention is to realize high-speed image processing.

Another object of the present invention is to provide a copying machine which processes an image with high quality.

Still another object of the present invention is to optimize the determination of coefficients.

Another object of the present invention is to optimize a LOG conversion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17 is a block diagram illustrating the construction of an image forming apparatus according to a third embodiment;

FIG. 20 is a table used in deciding the characteristics of an original;

FIG. 21 is a table used in deciding masking coefficients conforming to the characteristics of an original;

DESCRIPTION OF THE PREFERRED EMBODIMENTS

Preferred embodiments of the present invention will now be described in detail with reference to the accompanying drawings.

Figure 1:
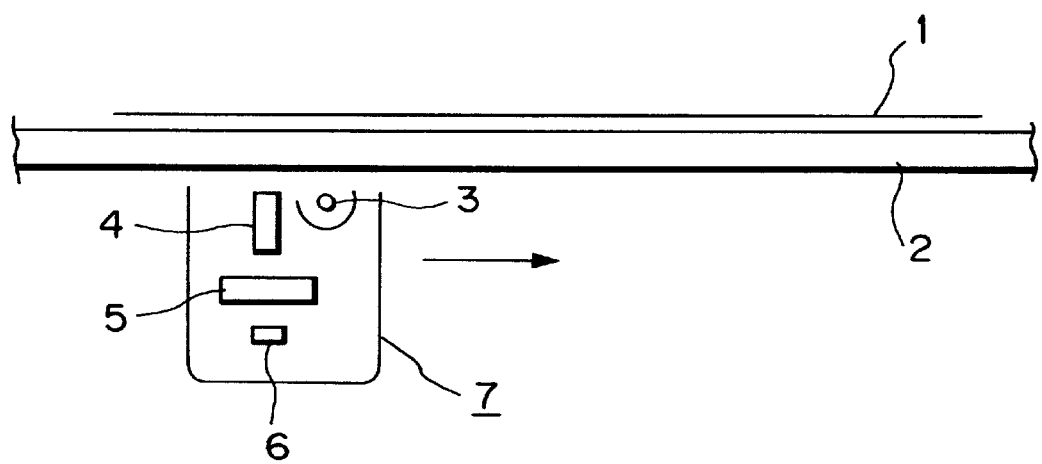
FIG. 1 is a diagram showing the construction of an image reading section according to the prior art.
Figure 2A:
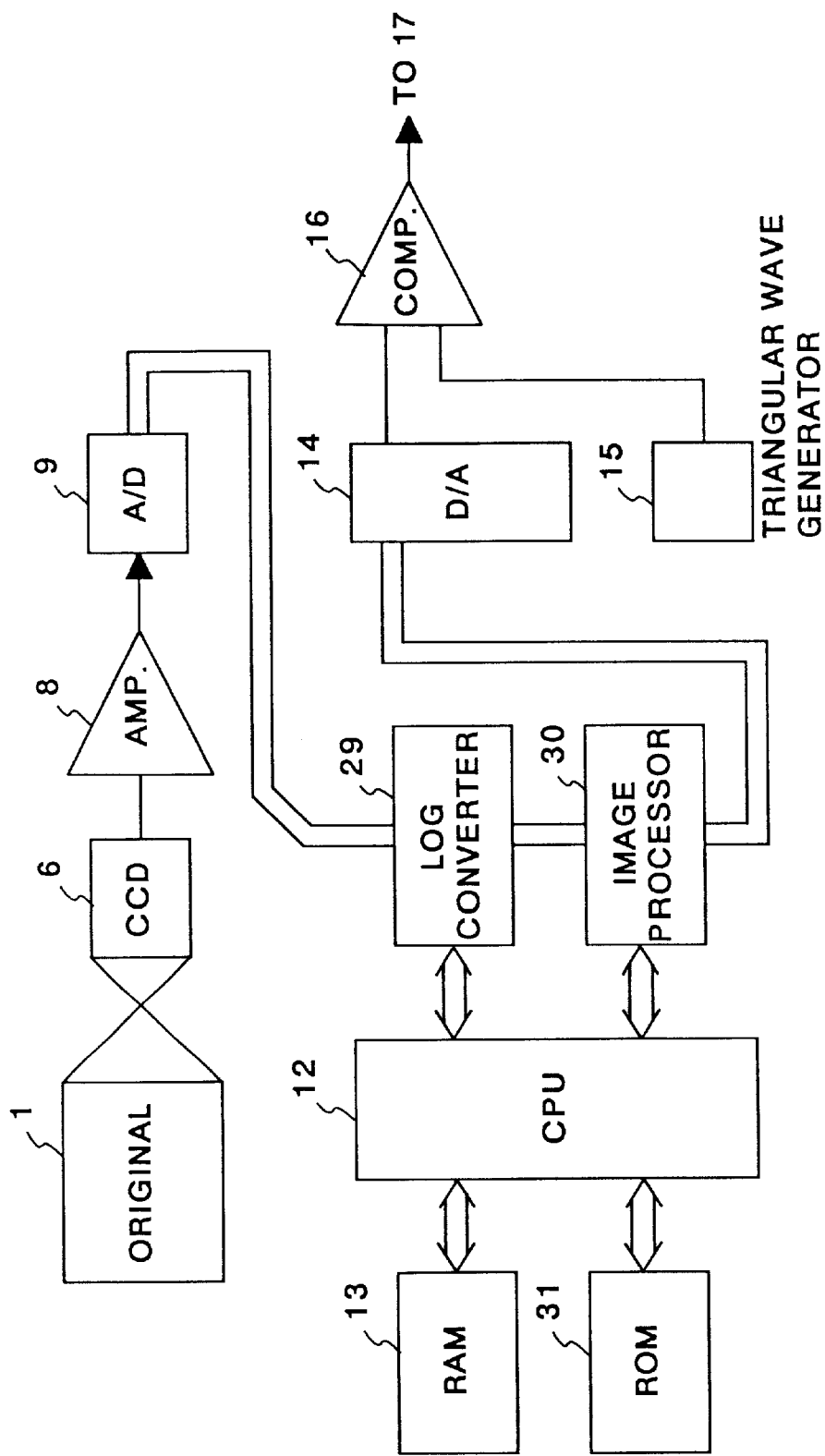
FIGS. 2A, 2B are diagrams showing the construction of an image forming apparatus according to the prior art.
Figure 2B:
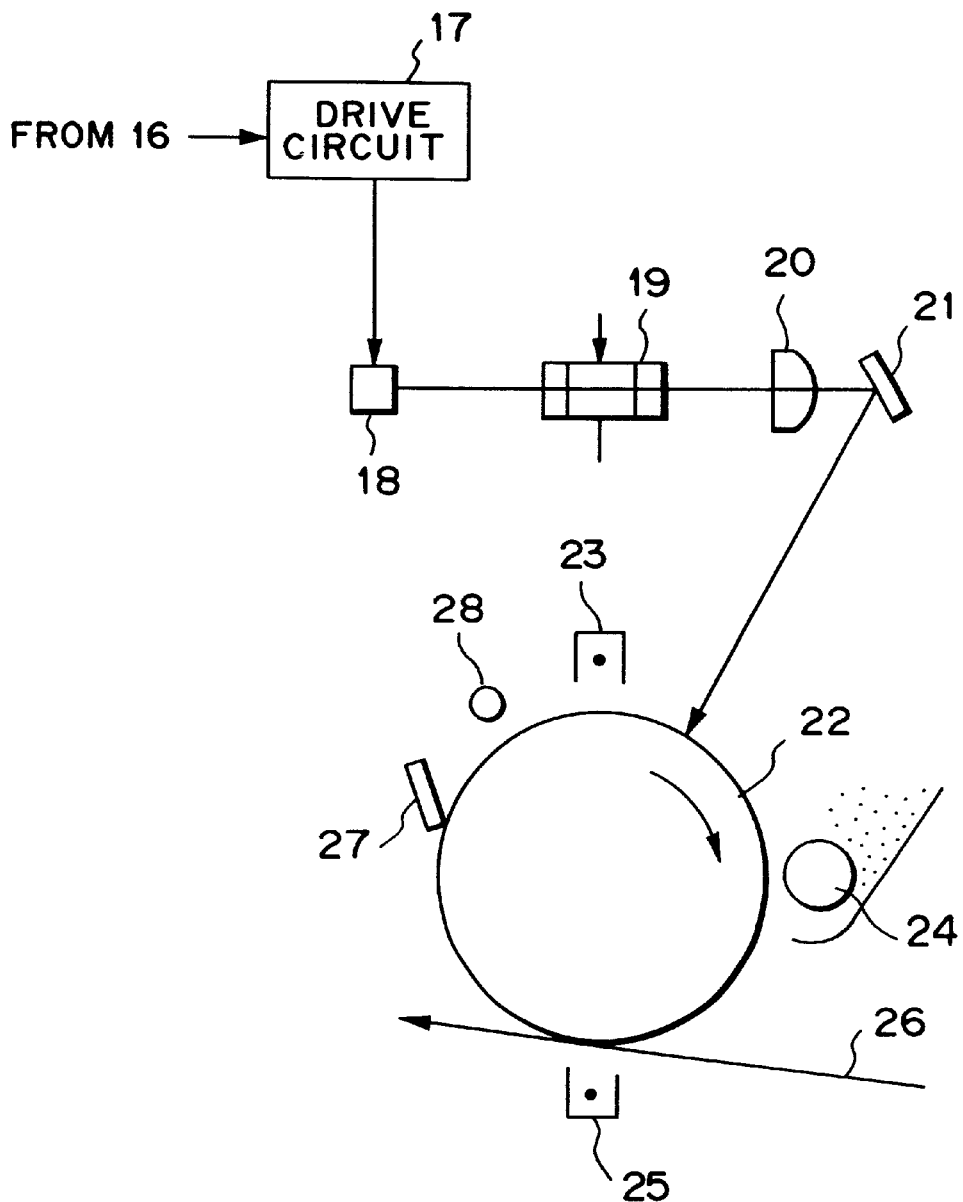
Figure 3:
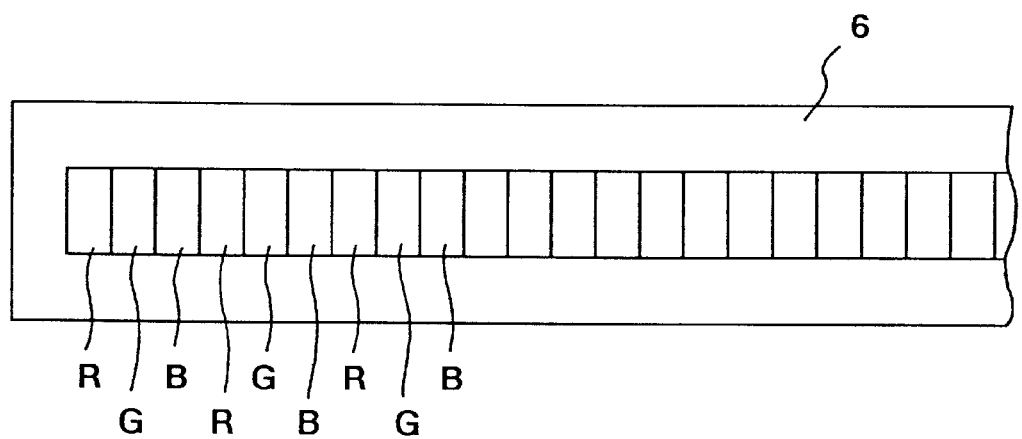
FIG. 3 is an enlarged schematic diagram a CCD sensor.
Figure 7A:
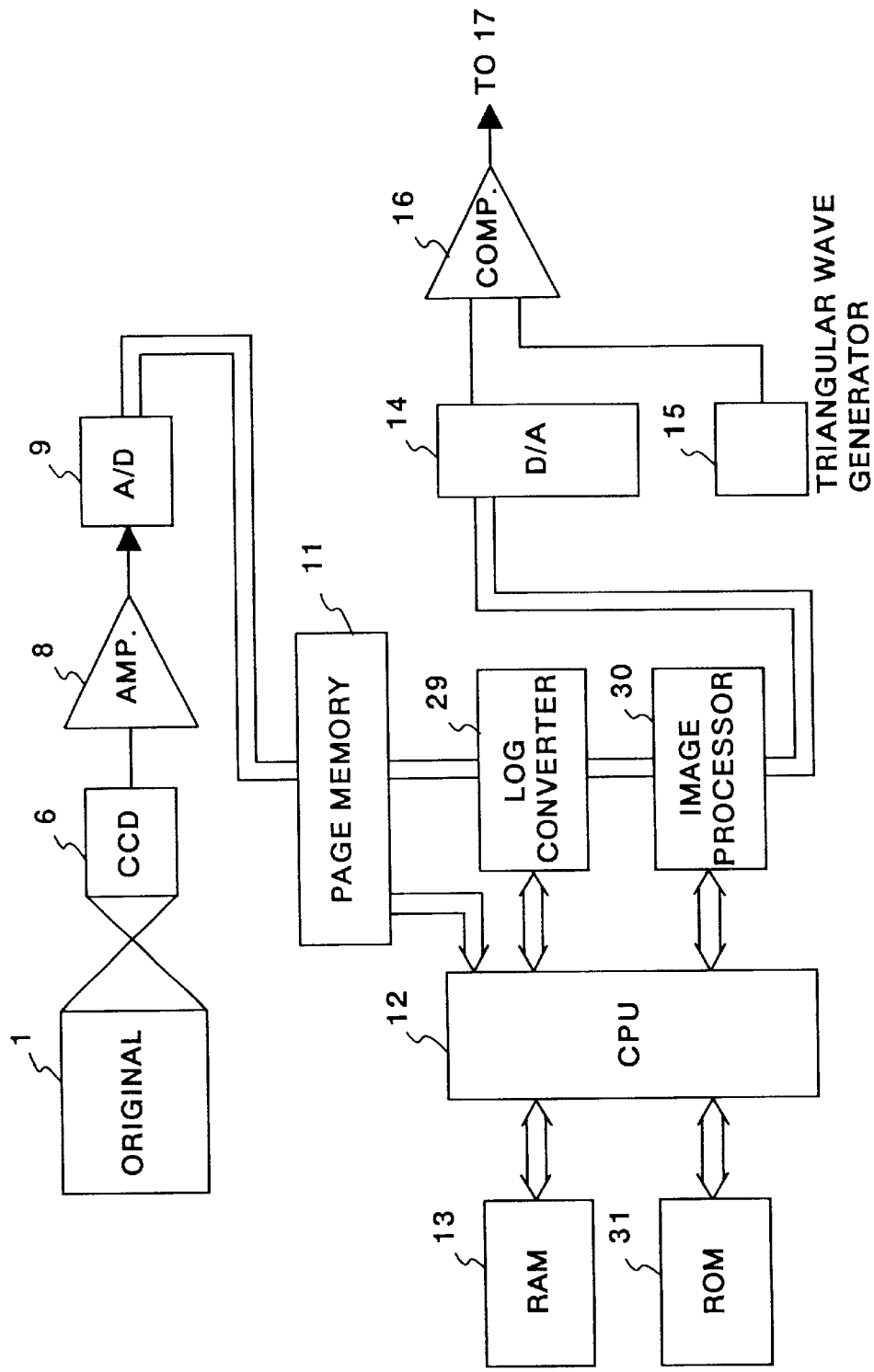
FIGS. 7A and 7B are diagrams showing the construction of an image forming apparatus according to a first embodiment of the present invention.
Figure 7B:
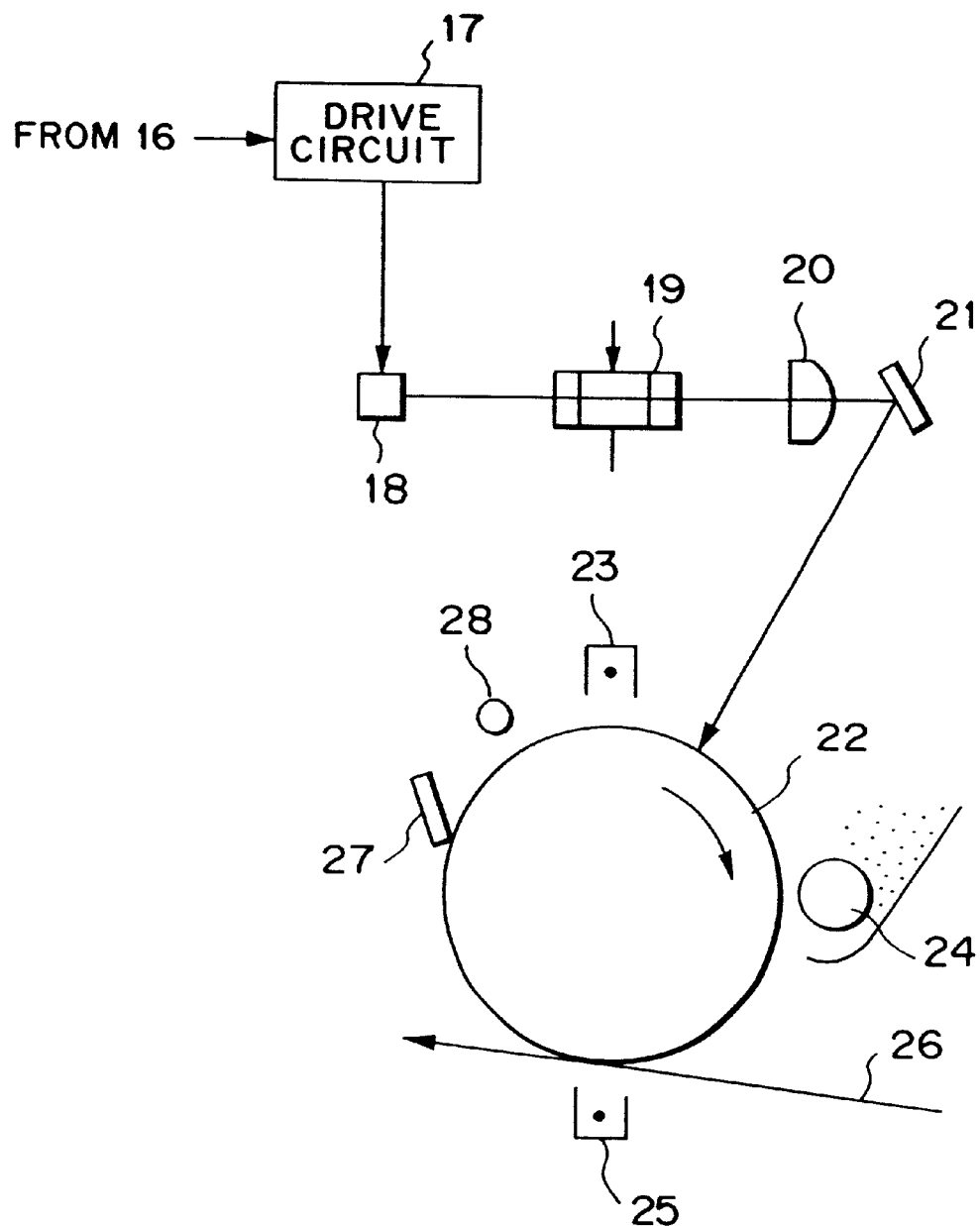

FIGS. 7A, 7B are block diagrams illustrating the construction of an image forming apparatus according to a first embodiment of the present invention. Portions having the same reference characters as those shown in FIGS. 2A and 2B are not described again.

Numeral 11 denotes a page memory for storing digital data after an original is read. Under the control of the CPU 12, the page memory 11 is switched to a mode in which it transfers digital data to the CPU 12 or to a mode in which it transfers digital data to LOG converting circuit 29. Numeral 13 denotes a RAM which stores the results of processing performed by the CPU 12 and from which data can be acquired by the CPU 12 when necessary.

In the arrangement shown in FIG. 7A, digital image data corresponding to the original read by the CCD 1 is stored in the page memory 11 in pixel units.

Figure 8:
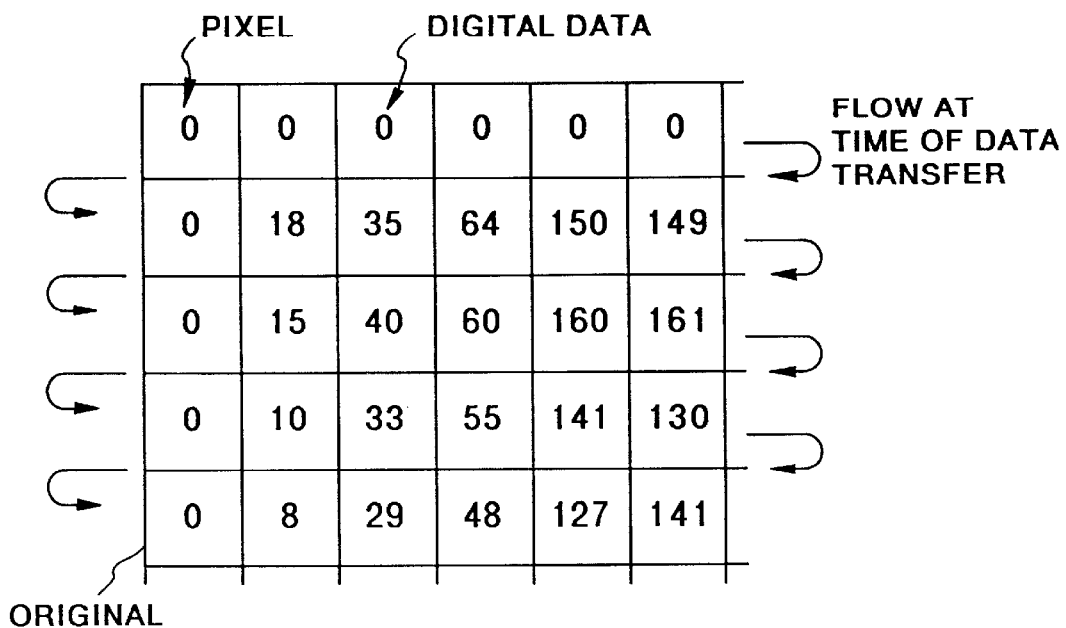
FIG. 8 is a table showing the density distribution of an original in pixel units.

When digital image data for each pixel has the form shown in FIG. 8, by way of example, image data is written successively in eight-bit units (a byte) in the directions of the arrows at addresses corresponding to the pixels of the page memory 11.

Figure 9:
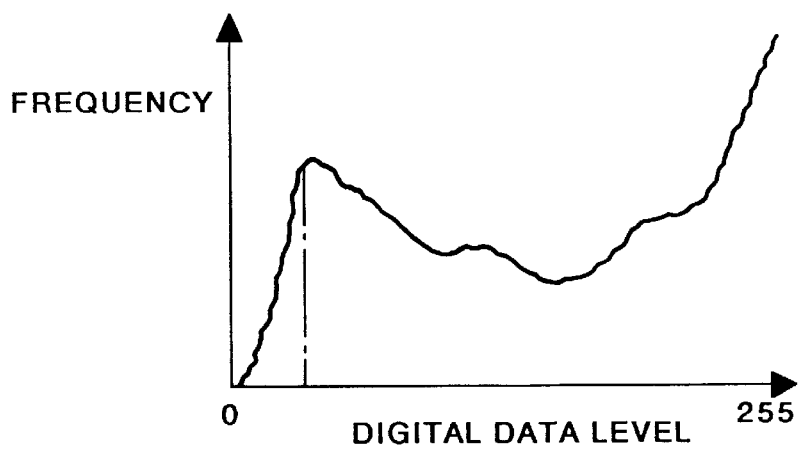
FIG. 9 is a graph showing the relationship between CCD output level and frequency.
Figure 10:
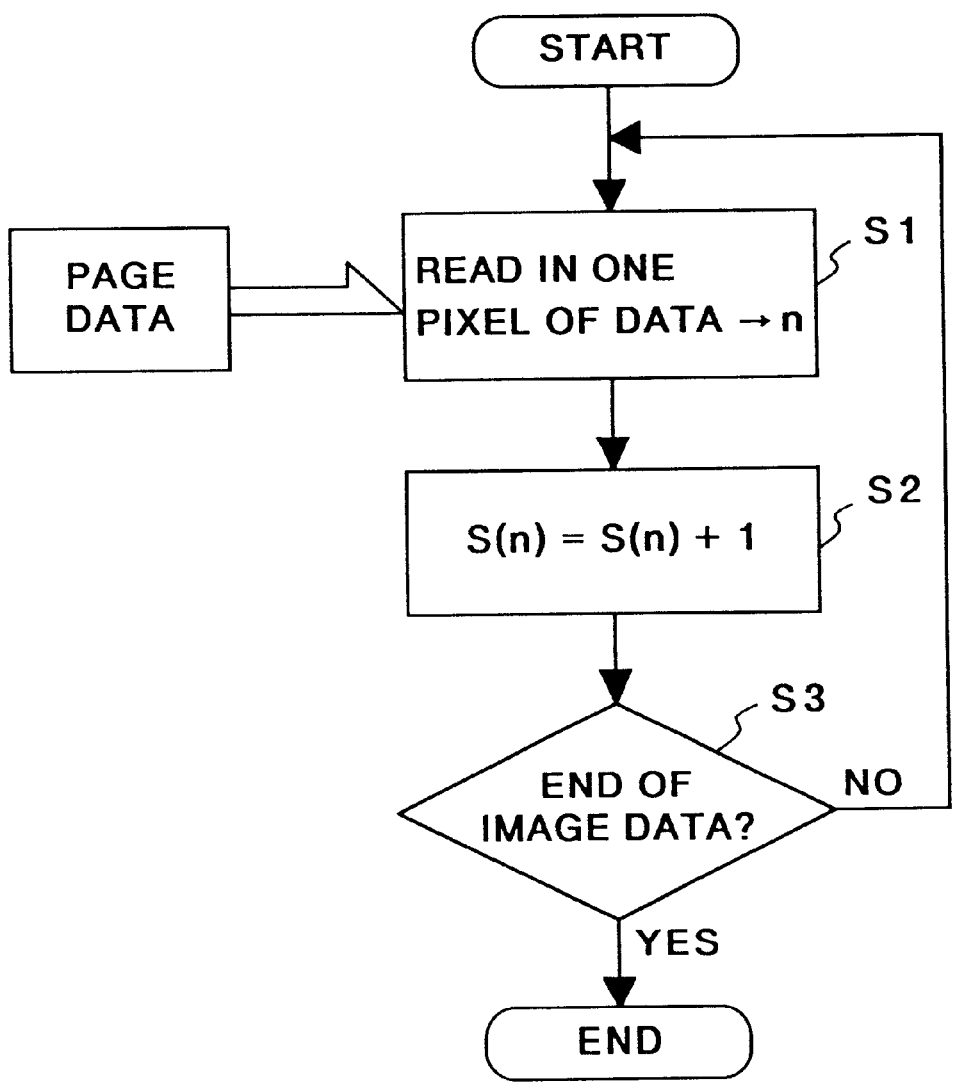
FIG. 10 is a flowchart showing a processing procedure for creating a frequency distribution.

Next, the CPU 12 reads the above-mentioned data and creates a histogram of the image data of the kind shown in FIG. 9 in the RAM 13. At this time the CPU 12 executes processing in accordance with the flowchart of FIG. 10 and calculates the frequency S(n) of each n-th level of the digital data "0–255". First, at step S1 shown in FIG. 10, the data (n-th level) of one pixel is read out of the page memory 11, and then the frequency of this level is incremented at step S2.

Next, it is determined at step S3 whether all pixels have ended. If it has not ended, the foregoing processing is repeated. When necessary, the memory of RAM 13 is used and the final frequency distribution S(n) also is preserved in the RAM 13.

More specifically, the creating method of the histogram is not limited to that, and other well known methods may be used.

Figure 11:
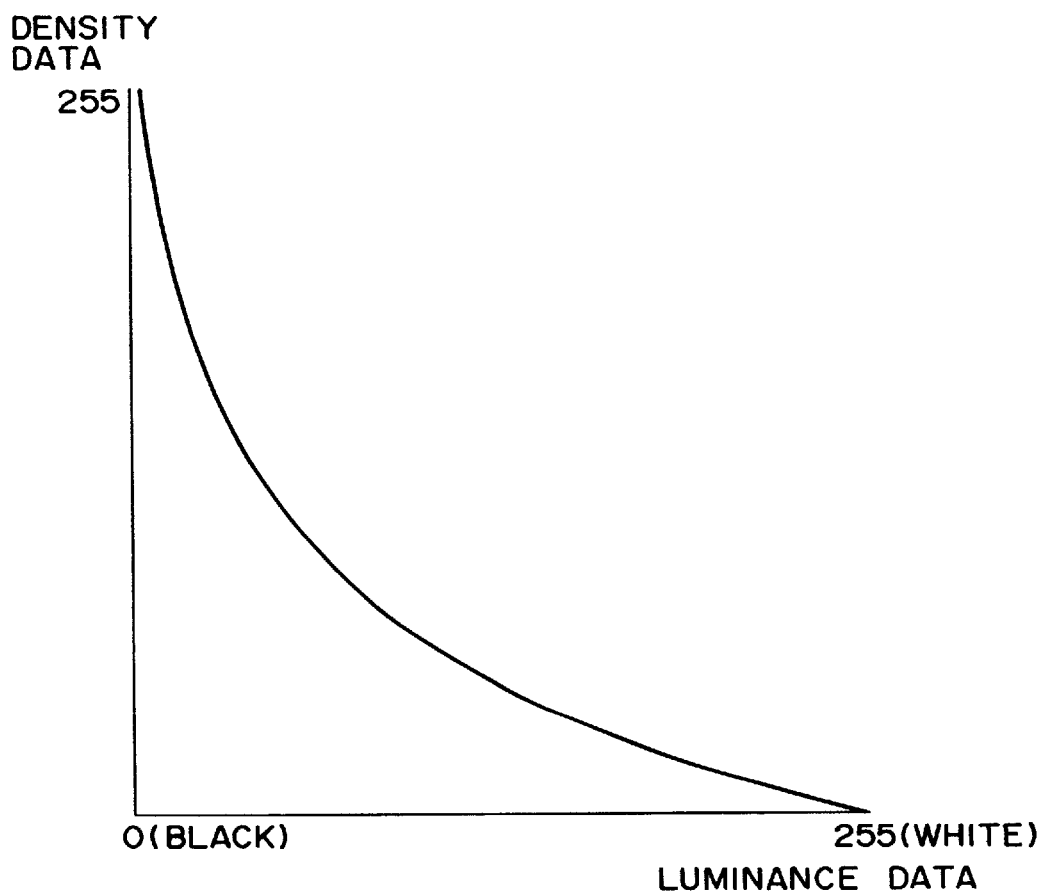
FIG. 11 is a graph showing a luminance-density conversion table (LOG conversion table) characteristic.

Meanwhile, the CCD sensor output, which is luminance information indicative of the original image, is converted into density data by the LOG converting circuit 29, as shown in FIG. 11. First, the CCD sensor output is amplified through the amplifier 8 and converted into digital data of eight bits (0–255). In this case the data "0" is a black output which prevails when the lamp for illuminating the original is not lit, and the data "255" is a white output which prevails when the lamp is lit.

Next, the LOG converting circuit 29 subjects this output to a density conversion to effect a conversion into data corresponding to density. Here a LOG curve is used as a density conversion table. Density $D_n$ can be expressed by the following equation:

$$D_x = -\log\frac{x}{255} \qquad (2)$$

where n represents image data, and $D_b$, $D_a$ respectively represent the maximum density and minimum density reproduced. By selecting $D_b$, $D_a$, the range of density reproduction can be changed.

In the aforementioned histogram, portions (e.g., data 0–7) having a low image data level correspond to dark portions of the original. In a case where the frequency of data in this region is high, this means that the original contains many high-density portions.

A procedure for selecting the optimum LOG conversion table for an original is now be described in accordance with the flowchart shown in FIG. 12.

Density Dx is as expressed by the following equation, where x represents image data:

$$D_n = \frac{255}{D_b - D_a} \times \left(-\log\frac{n}{255}\right) \qquad (1)$$

in which $D_x$=2.4 when x=1 holds;
  $D_x$=1.8 when x=4 holds; and
  $D_x$=1.6 when x=7 holds.

At this time the histogram is divided into several groups and the cumulative frequency of each group is obtained at step S11. For example, if the cumulative frequency of image data 0–4 is $n_1$ and the cumulative frequency of image data 5–7 is $n_2$, then $n_1$ represents the sum of the frequency of pixels whose densities are greater than 1.8 and $n_2$ represents the sum of the frequencies of pixels whose densities are 1.6–1.8.

Next, at step S12, the $n_1$ obtained is compared with a predetermined threshold value $m_1$, and a LOG table (1) is selected at step S13 if $n_1 \geq m_1$ holds. If $n_1 < m_1$ holds, however, the program proceeds to step S14, where the $n_2$ obtained is compared with a predetermined threshold value $m_2$. A LOG table (2) is selected at step S15 if $n_2 \geq m_2$ holds. If $n_2 < m_2$ holds, however, a LOG table (3) is selected at step S16. Image processing is executed upon selection of the LOG table.

Figure 13:
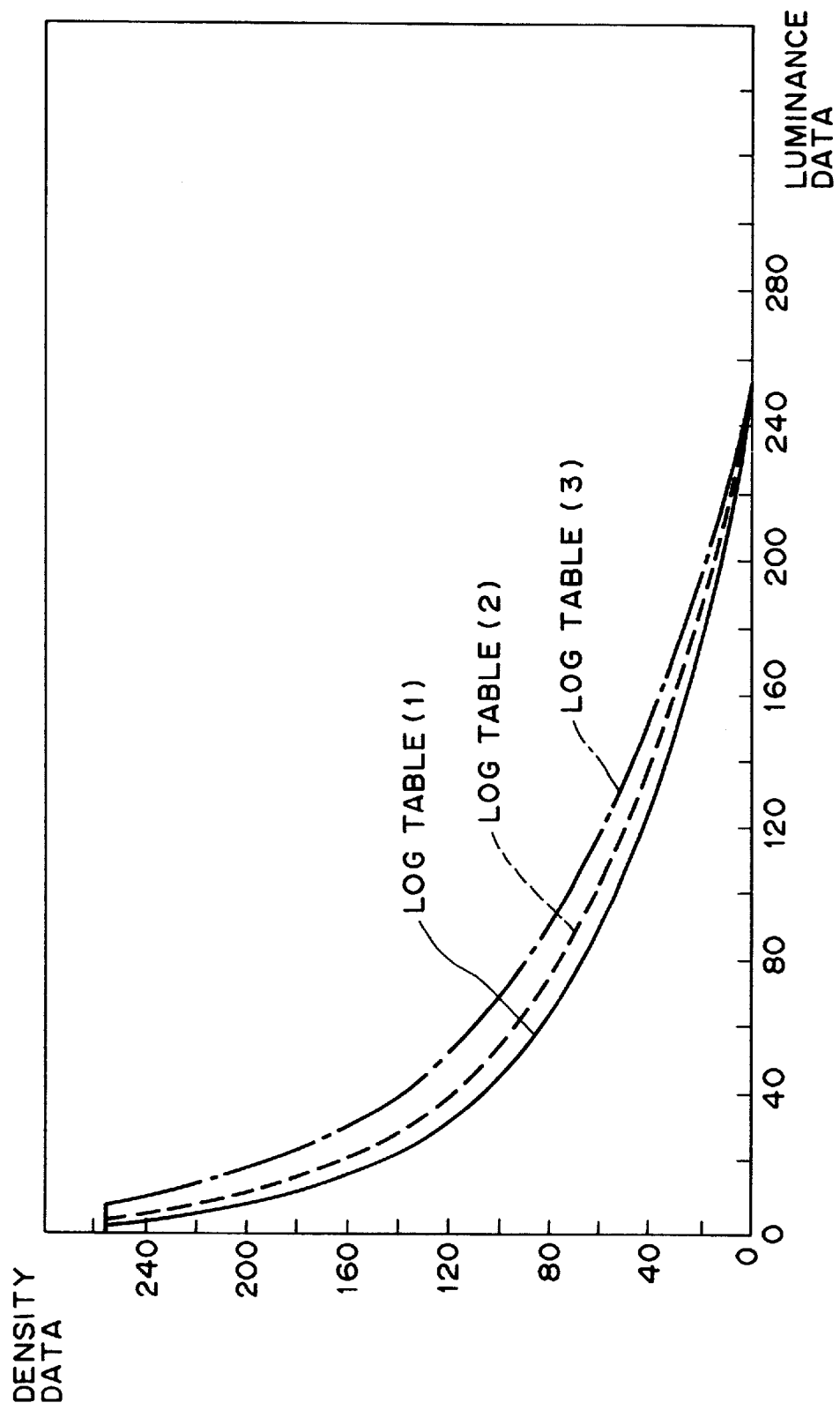
FIG. 13 is a graph showing a LOG conversion table characteristic.

It should be noted that the above-mentioned LOG tables (1)–(3) are set in accordance with data of the kind shown in FIG. 13 and are stored in a ROM 31 (FIG. 7A) in advance.

More specifically, the LOG table (1) represents an image having many portions in which density is greater than 1.8, and the settings in Eq. (1) are $D_a$=0.1, $D_b$=2.0. The LOG table (2) represents an image in which there are few high-density portions of greater than 1.8 but many portions in which density is 1.6–1.8. Similarly, the settings made are $D_a$=0.1, $D_b$=1.8. The LOG table (3) represents a comparatively faint image in which maximum density is less than 1.6. Here the settings made are $D_a$=0.05, $D_b$=1.5.

Figure 12:
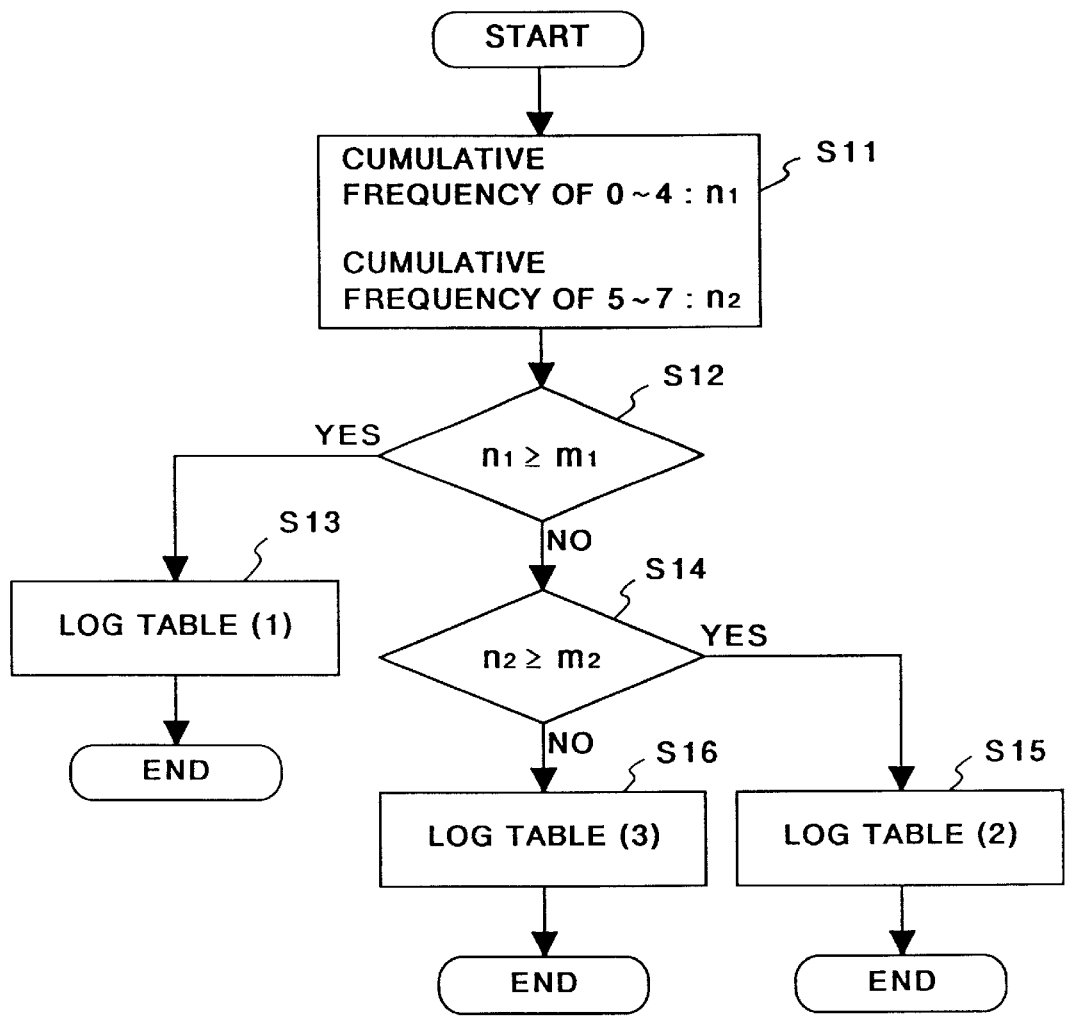
FIG. 12 is a flowchart showing a procedure for selecting a LOG conversion table.

The CPU 12 reads the optimum LOG conversion table from the ROM 31 in dependence upon the results of the flowchart shown in FIG. 12 and sets this table for the LOG converting circuit 29 to use in forming an image.

Thus, in accordance with this embodiment, as described above, light-and-shade information of an original image is made the output level and the frequency distribution thereof is analyzed, thereby making it possible to form an image using a LOG conversion table suited to the original image.

Specifically, for an original having many high-density portions, an image is formed using a LOG conversion table which generates density data that enables reproduction of the tonality of the high-density portions. For an original which is comparatively faint, an image is formed using a LOG conversion table which generates density data that assures tone reproduction up to the maximum density of the original even if high-density portions cannot be reproduced. As a result, tone reproduction suited to the original image can be realized at all times.

Furthermore, in a case where a copy is made from a copy serving as the original, a difference in density between this original and the second-generation copy thereof can be minimized. This effect is evident from the gist of the invention.

Figure 14A:
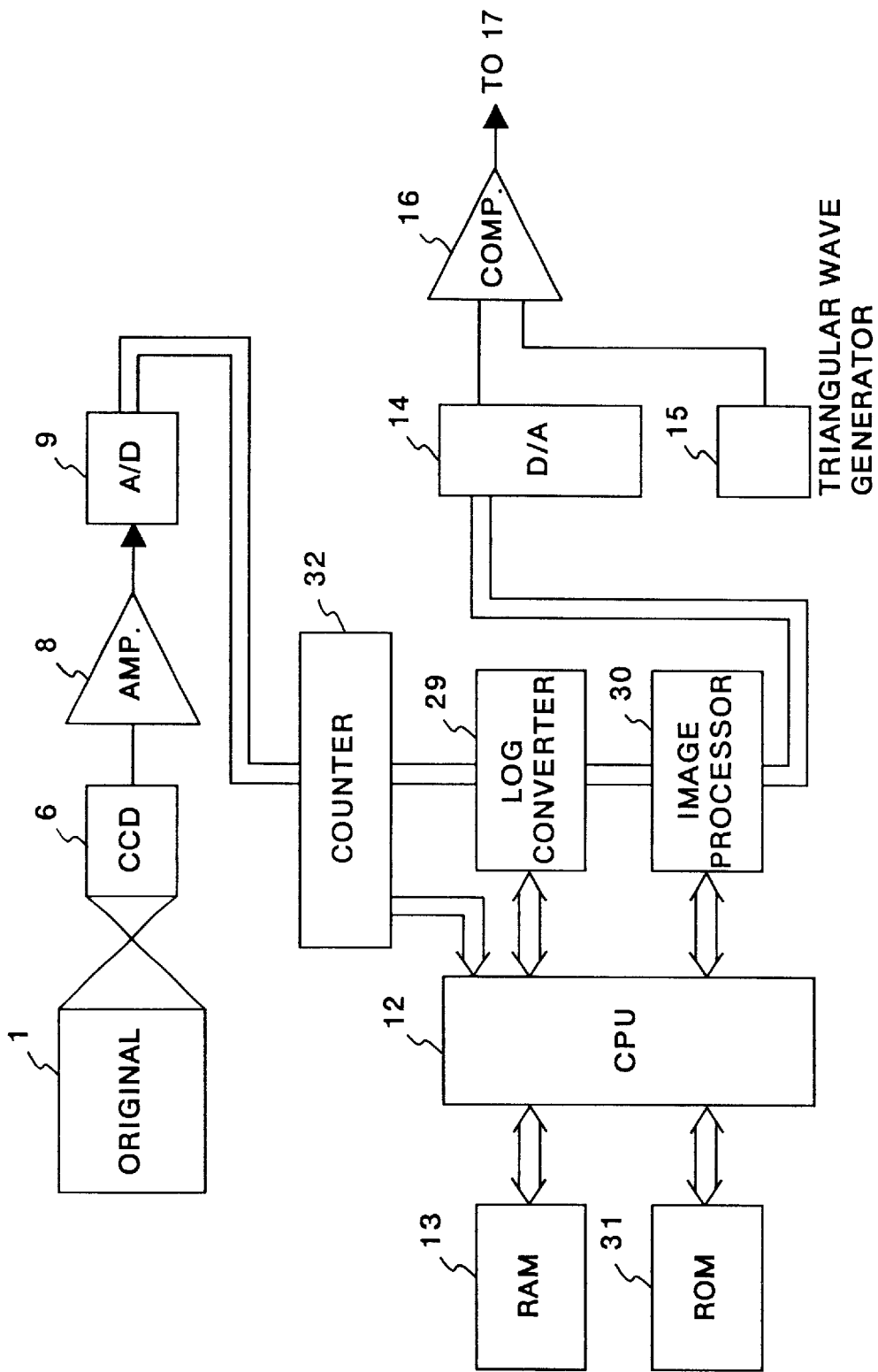
FIGS. 14A and 14B are schematic block diagrams illustrating the construction of an image forming apparatus according to a second embodiment.
Figure 14B:
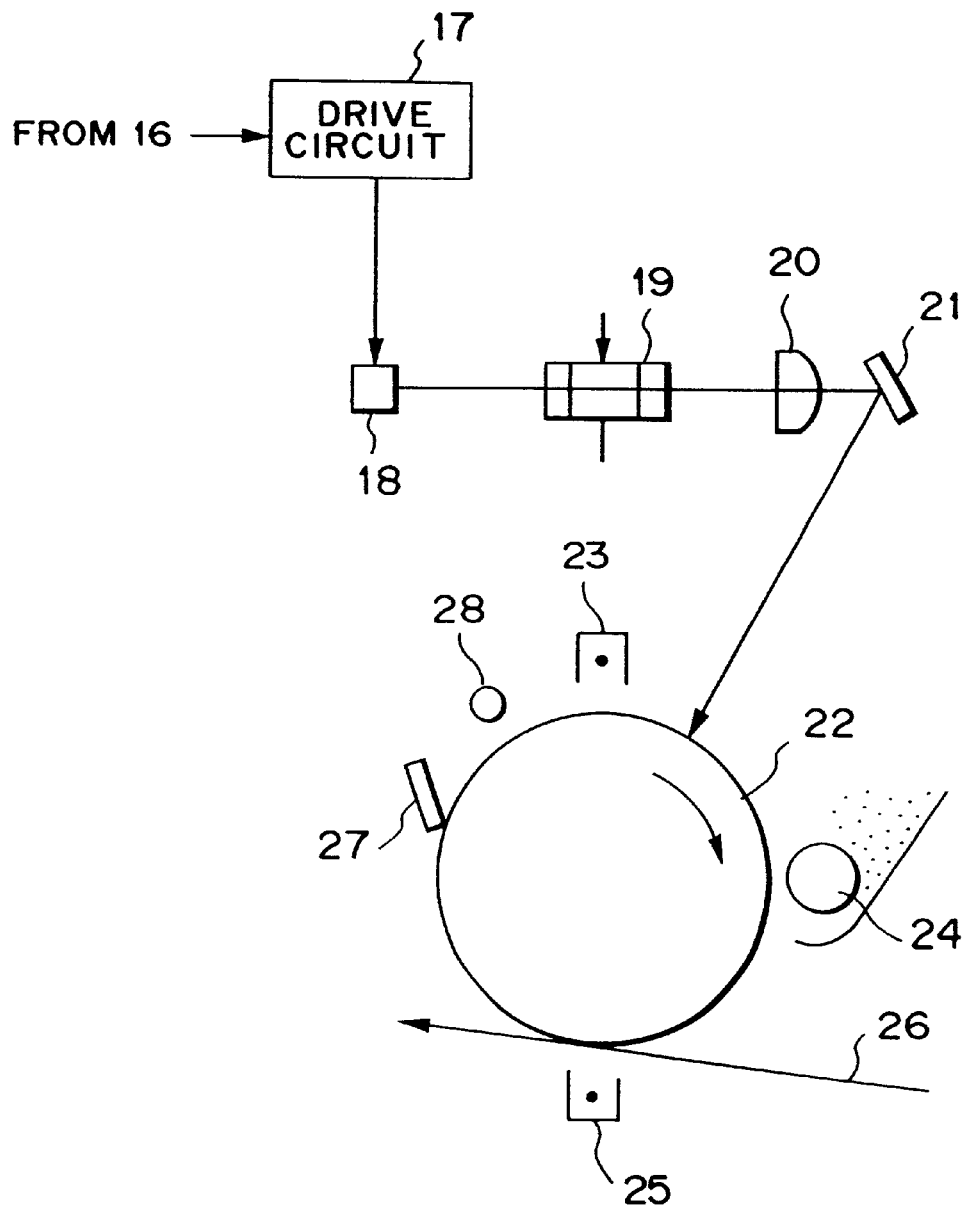

A second embodiment of the present invention will now be described with reference to the block diagrams shown in FIGS. 14A and 14B.

Numeral 32 denotes a counter circuit; other portions are identical with those shown in FIGS. 7A and 7B. In the first embodiment described above, the frequencies of all levels of the digital data are stored. In this embodiment, however, the frequencies of two groups, namely the 0–4 and 5–7 levels, by way example, are accumulated. Accordingly, the counter 32 is as shown in FIG. 15.

Figure 15:
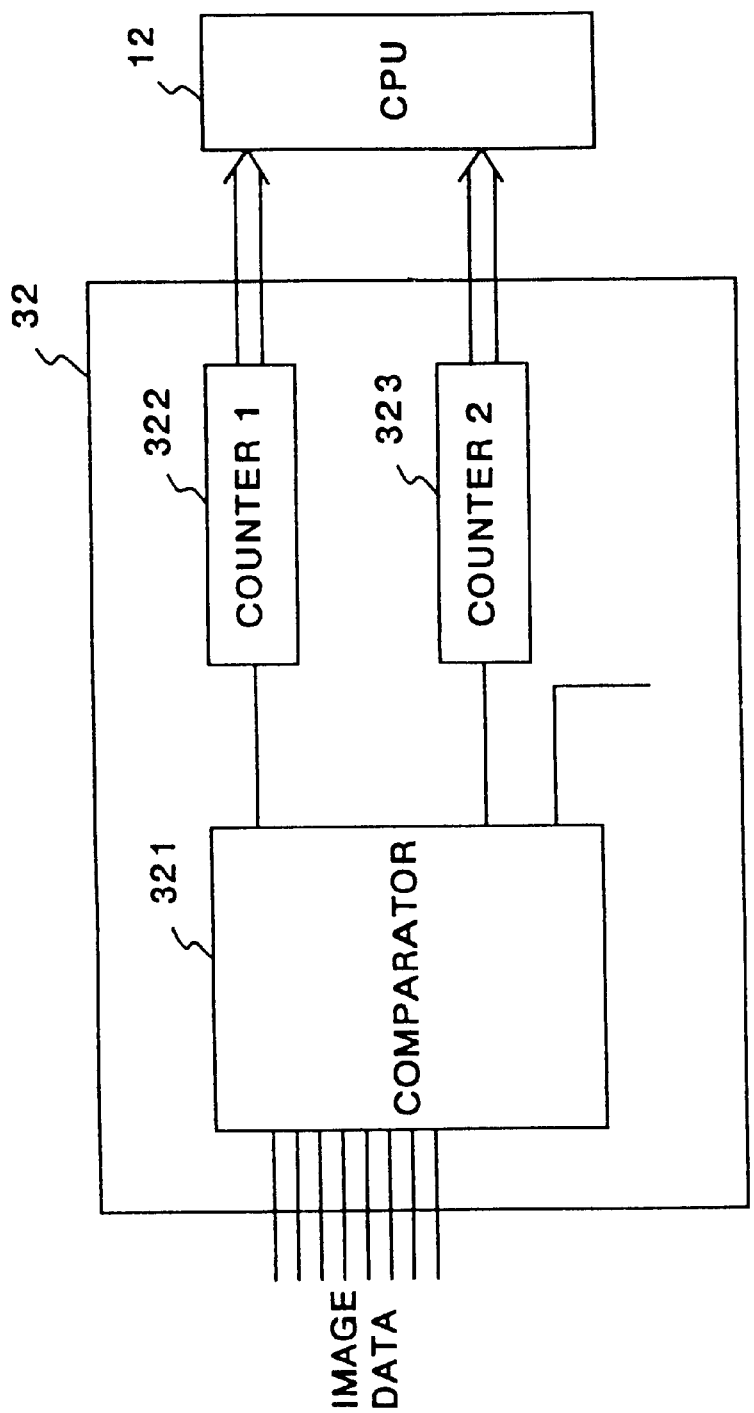
FIG. 15 is a block diagram of a counter.

In FIG. 15, when a first scanning (pre-scanning) is performed by the image reading apparatus including a CCD, image data sent in the form of eight bits is judged by a comparator 321, data corresponding to bits 0–4 sends an ON signal to counter 1, and data corresponding to bits 5–7 sends an ON signal to counter 2. Counters 322 and 323 perform an adding operation in dependence upon the respective ON signals.

Thus, with regard to the CCD output of light-and-shade information of an original image, the frequencies of data (e.g., 0–4, 5–7) corresponding to high-density portions are added (let the results be represented by $n_1$, $n_2$), and the counter circuit 32 transfers the cumulative frequencies $n_1$, $n_2$ to the CPU 12 in accordance with control of the CPU 12 after reading of the original ends.

The processing from this point on is the same as that of the first embodiment. Accordingly, the LOG conversion table is set, a second scanning (main-scanning) is performed by the image reading apparatus, and the read image data is processed.

According to this embodiment, the costly page memory employed in the first embodiment need not be used, and therefore cost can be lowered. Effects equivalent to those of the first embodiment can be obtained with regard to an image.

<Modification>

A case will now be described in which the present invention is applied to a color-image forming apparatus.

It should be noted that the construction of the image forming apparatus of this modification is not directly related to the essence of the present invention and therefore is not illustrated.

Figure 16A:
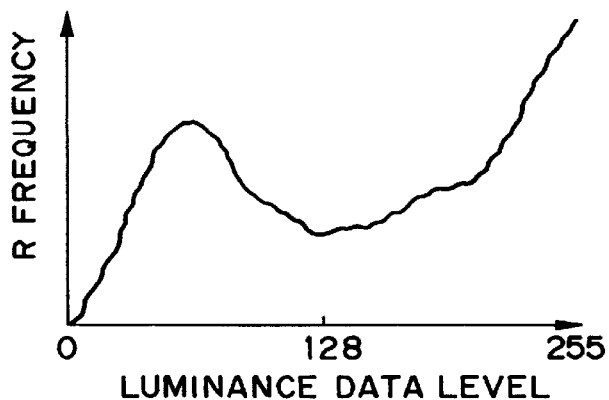
FIGS. 16A–16C are graphs showing frequencies versus CCD output levels of the colors R, G, B when a color original is read.
Figure 16B:
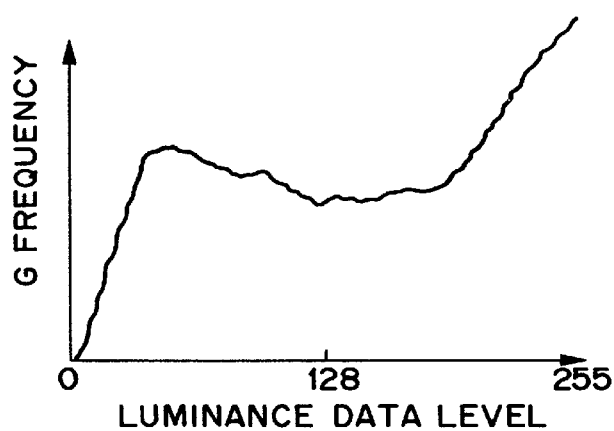
Figure 16C:
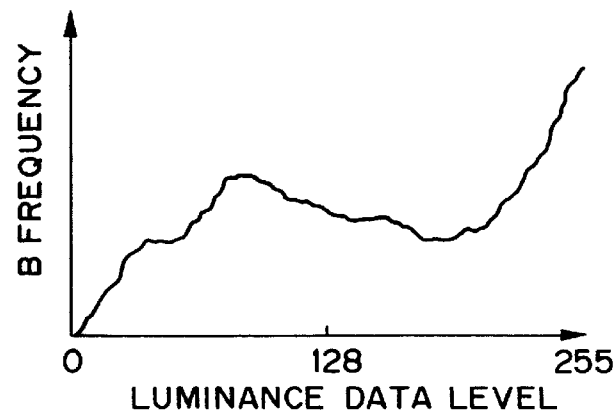

As in the foregoing embodiments, an original is read in by a CCD, but a color separating filter is provided ahead of the CCD and the color components of the original are read though this filter. The frequency distributions of the CCD outputs corresponding to red, green and blue are generated in the same manner as in the foregoing embodiments. FIGS. 16A–16C are graphs illustrating luminance data levels and frequency distributions according to this embodiment.

As in the two embodiments described above, the cumulative frequency of each group corresponding to high-density portions is obtained for every color. Let $n_{1R}$, $n_{2R}$ represent the results of calculating the cumulative frequency of red, and let $n_{1G}$, $n_{2G}$; $n_{1B}$, $n_{2B}$ represent the results of calculating the cumulative frequencies of green and blue, respectively. The average cumulative frequency in each group is obtained. Let these be represented by $n_1$, $n_2$.

$$n_1=(n_{1R}+n_{1G}+n_{1B})/3$$

$$n_2=(n_{2R}+n_{2G}+n_{2B})/3$$

Processing from this point onward is the same as in the foregoing embodiments. The CPU 12 extracts the optimum LOG conversion table for the original and then performs image formation.

Thus, in accordance with this embodiment, as described above, it is possible to realize tone reproduction suited to the image of the original.

Figure 16D:
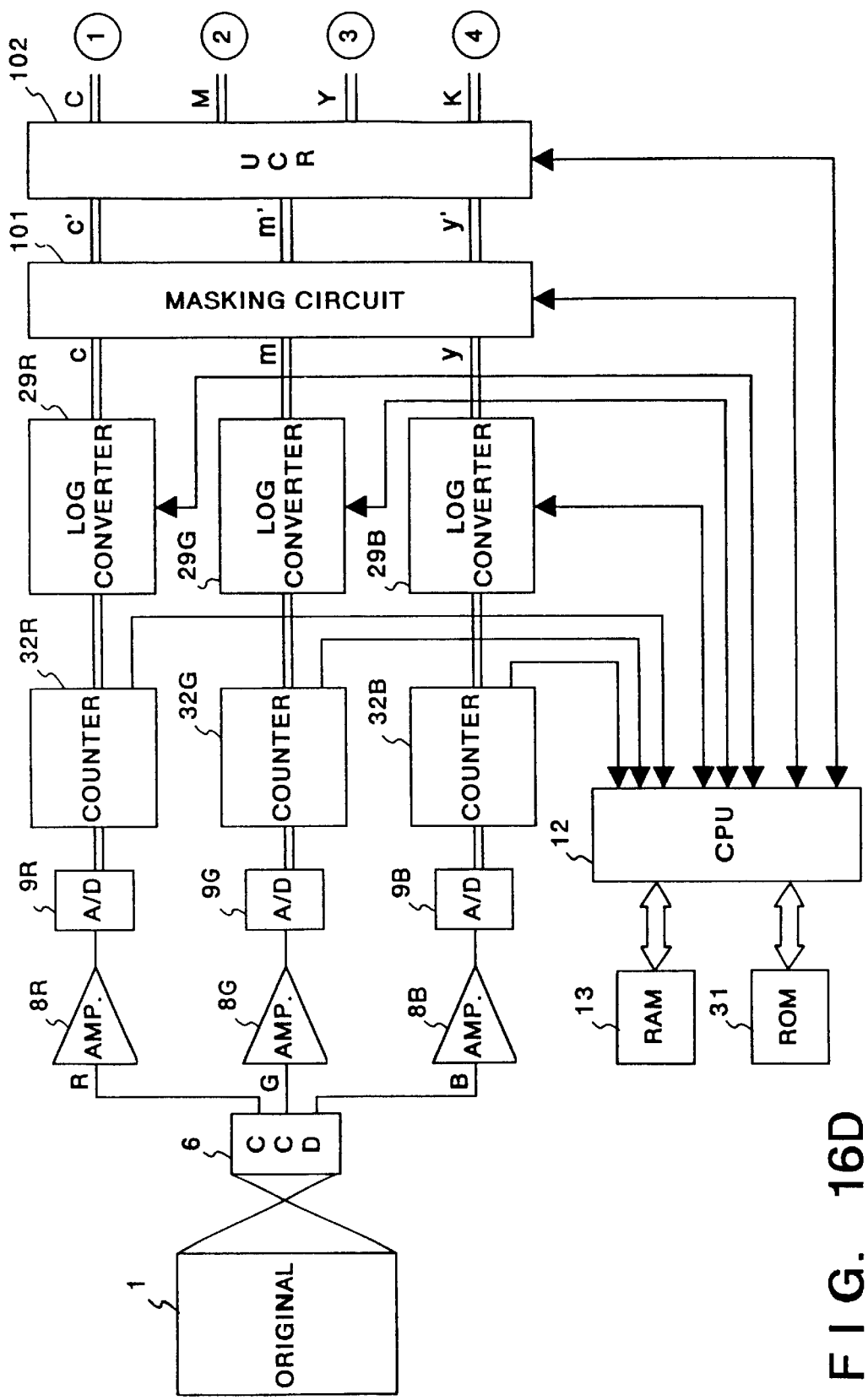
FIGS. 16D and 16E are block diagrams of a modification to the present invention.
Figure 16E:
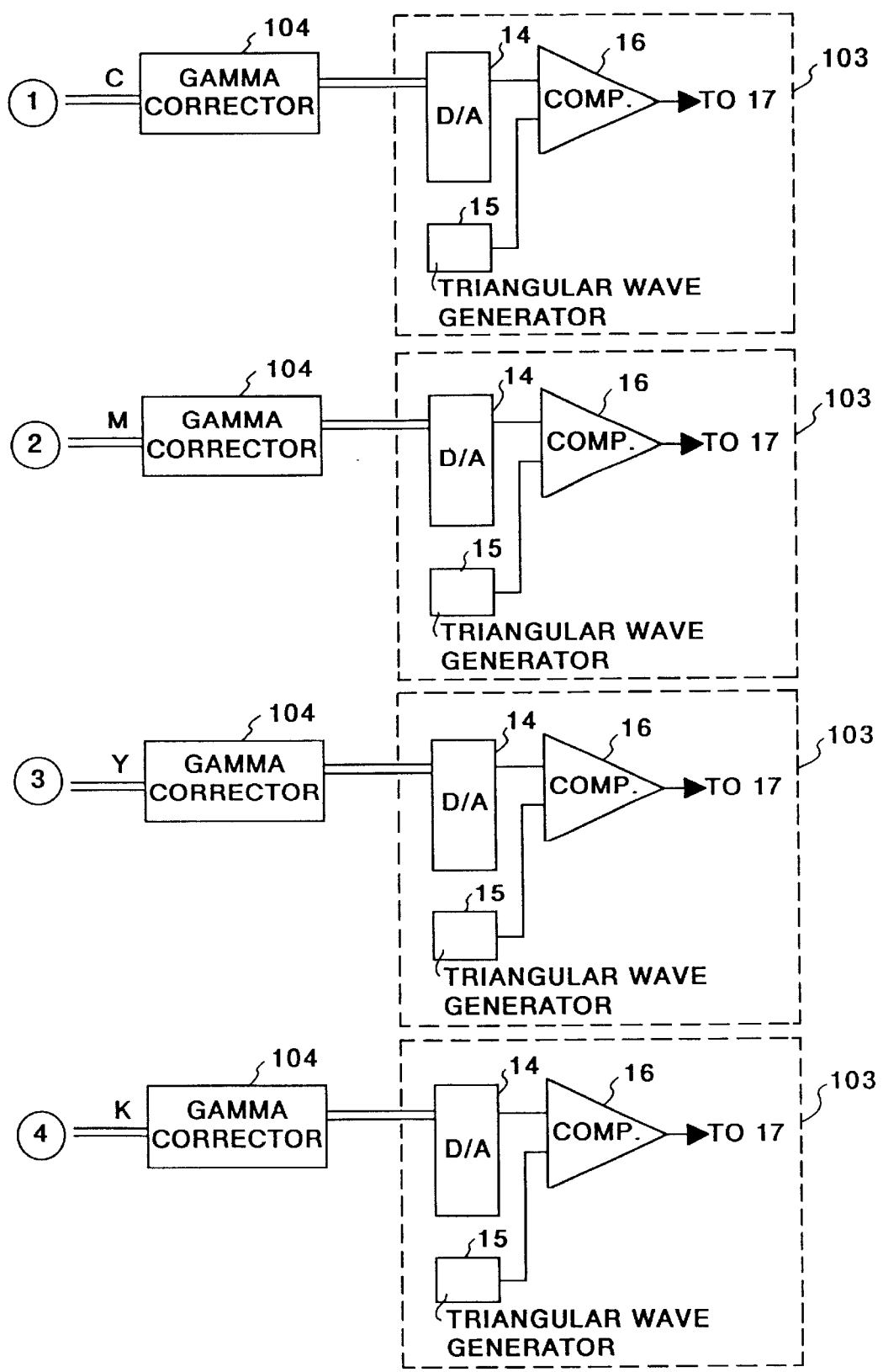

FIGS. 16D and 16E are block diagrams illustrating the construction of an image forming apparatus according to this embodiment.

In this embodiment, the apparatus has an amplifier 8, A/D converting circuits 9R, 9G and 9B counter circuits 32R, 32G and 32B a LOG converting circuits 29R, 29G and 29B a gamma correcting circuit 104 for each of the R, G and B signals, and a PWM circuit 103 for each of R, G, B signals, and further has a masking circuit 101 and an UCR (Under Color Removal) circuit 102.

The operation of each portion is the same as in the forgoing embodiments.

In accordance with this embodiment, the masking circuit 101 performs color correction using a plurality of color components, and the LOG converting circuits 29R, 29G, 29B perform a digital conversion for each of color components with respect to the density histogram of the original.

Consequently, it is possible to perform a color processing using a dynamic range of input signals. Moreover, the coefficients used in the masking circuits 101 and UCR circuit 102 may be corrected depending upon a count manifested by the counters 32R, 32G and 32B.

A third embodiment of the present invention will now be described with reference to the drawings.

Figure 4:
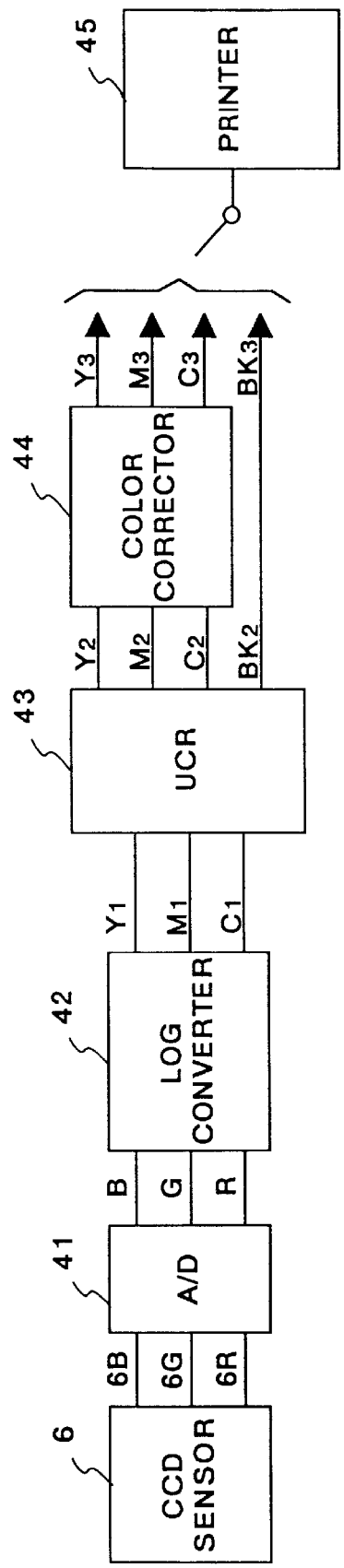
FIG. 4 is a block diagram of a color-image processing apparatus according to the prior art.

FIG. 17 is a block diagram illustrating the construction of an image forming apparatus according to a third embodiment. Portions having the same reference characters as those shown in FIG. 4 are not described again.

In FIG. 17, numeral 46 denotes a CPU for executing processing in accordance with a processing procedure (program) stored in a ROM 47, described below. Numeral 48 denotes a RAM which stores the results of processing performed by the CPU 46, and from which data can be extracted by the CPU 46 when necessary. Numeral 49 denotes a page memory for storing digital data after an original is read. The transfer of data is controlled by the CPU 46.

Figure 18:
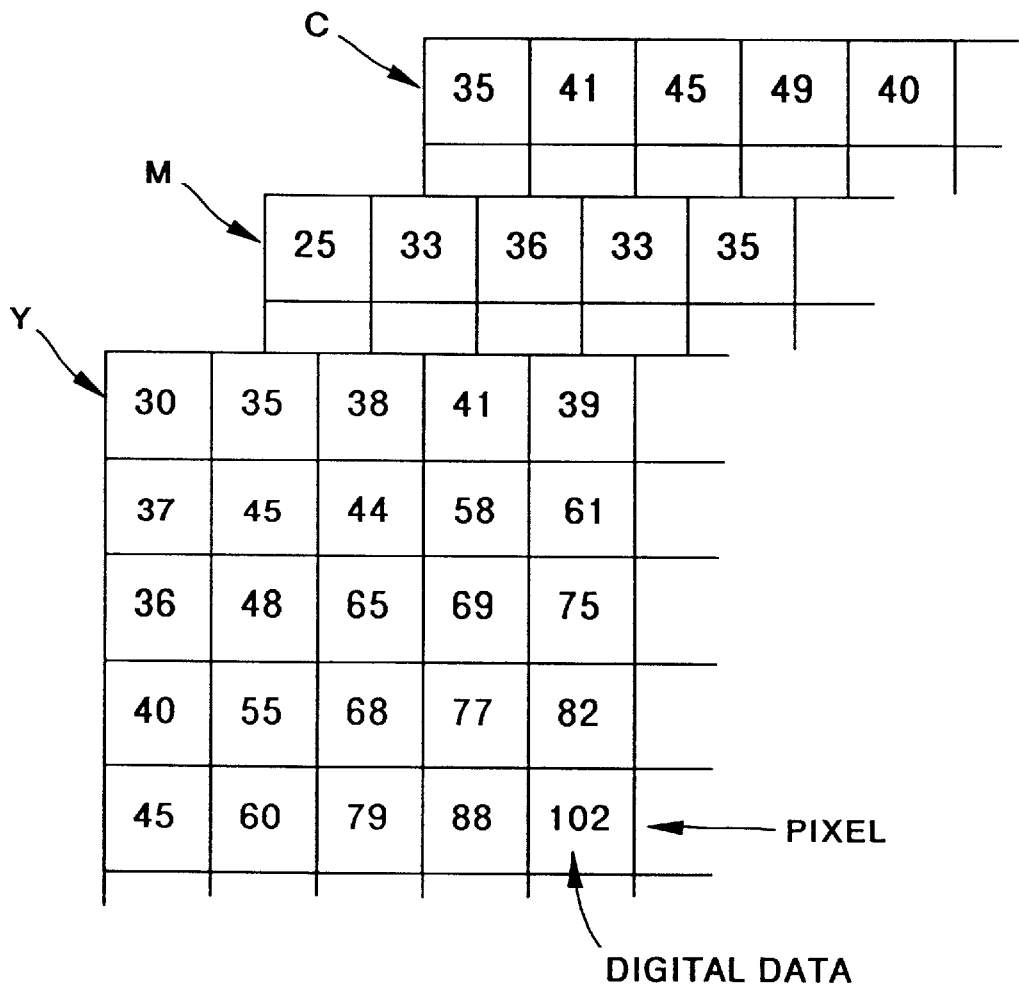
FIG. 18 is a diagram in which a color-separated original is represented in pixel units.

In this arrangement, B, G, R color-original data read in by the CCD 6 is converted into digital data by an A/D converting circuit 41. Next, the digital data is sent to a LOG converting circuit 42, where the digital data is subjected to a LOG conversion. The resulting data is stored in the page memory 49 in pixel units. In a case where color-separated digital image data for each pixel has the form shown in FIG. 18, for example, the digital data (eight bits) is written at predetermined addresses of the page memory 49 in the order of Y, M, C and in the order of the pixels.

Next, the CPU 46 reads the data output of the page memory 49 and calculates the cumulative number of the digital data level for every color with regard to all pixels. Let $N_Y$, $N_M$, $N_C$ represent the cumulative numbers corresponding to the colors of yellow, magenta and cyan, respectively.

A method of deciding masking coefficients using the results of the foregoing processing will now be described with reference to FIGS. 19 through 21.

A case will be described in which $N_Y > N_M > N_C$ holds with regard to the aforementioned $N_Y$, $N_M$, $N_C$.

Figure 19:
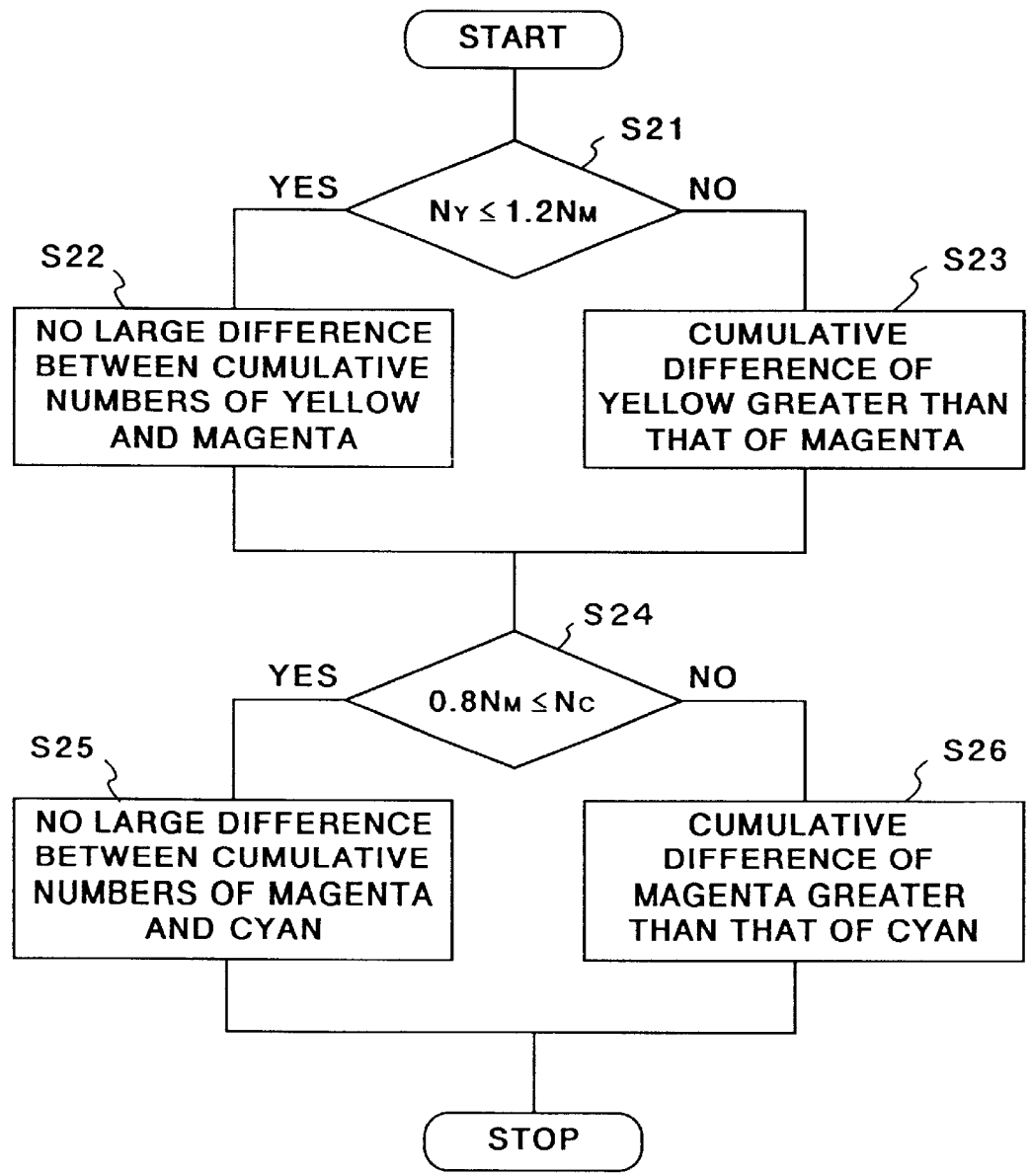
FIG. 19 is a flowchart for comparing cumulative numbers for each and every color.

First, the extent of the difference between $N_Y$ and $N_M$ and between $N_M$ and $N_C$ is determined in accordance with the flowchart shown in FIG. 19. Specifically, it is determined at step S21 whether $N_Y$ is 20% or more larger than $N_M$, for which the cumulative number is intermediate. In this way the extent of the difference between yellow and magenta is determined. In other words, if the answer at step S21 is YES, the determination of step S22 is made; if the answer is NO, then the determination of step S23 is made. It is determined at step S24 whether $N_C$ is 20% or more smaller than $N_M$. In this way the extent of the difference between magenta and cyan is determined. In other words, if the answer at step S24 is YES, the determination of step S25 is made; if the answer is NO, then the determination of step S26 is made.

The characteristics of an original shown in FIG. 20 are decided based upon the the results of the above-described determinations. For example, in the case of steps S22 and S25, there is no large difference in the cumulative numbers of yellow, magenta and cyan. Accordingly, it is decided that the colors are distributed to the same extent in the original or that there is a large gray distribution. In the case of steps S23 and S25, it is decided that the distribution of yellow in the original is large. Similarly, in the case of steps S23 and S26, the cumulative numbers of yellow and magenta are fairly large in comparison with cyan, and therefore it is decided that the distributions of yellow and red in the original are large.

After the color distributions in the original are thus judged, the appropriate masking coefficients are decided based upon the results of judgment, whereby appropriate color reproduction can be performed. In this embodiment, the decision of the masking coefficients is performed by selecting or calculating them from seven types of masking coefficients stored beforehand in the ROM 47.

These seven types of masking coefficients are the total of the masking coefficient used in the prior-art example and the six types of masking coefficients for which the reproducibility of the six colors yellow, magenta, cyan, blue, green and red is particularly outstanding. These coefficients shall be referred to as masking coefficients of types 0 through 6.

Masking coefficients corresponding to each of the cases shown in FIG. 20 are decided from these seven types of masking coefficients in the manner shown in FIG. 21. For example, a masking coefficient of type 0 similar to that of the prior art is selected in case of steps S22 and S25 in the flowchart of FIG. 19, and a masking coefficient of type 1, for which the reproducibility of yellow is especially good, is selected in case of steps S23 and S25. A masking coefficient of type 6, for which the reproducibility of red is especially good, is selected in case of steps S22 and S26. In case of steps S23 and S26, the average of a masking coefficient of type 1, for which the reproducibility of yellow is particularly good, and a masking coefficient of type 6, for which the reproducibility of red is particularly good, is calculated as the masking coefficient.

The CPU 46 sets the masking coefficients decided by the foregoing processing is a color correcting circuit 44. Thereafter, the data in the page memory 49 is sent to a UCR 43 and the color correcting circuit 44, the data is processed, and an image is then formed by a printer.

A method of calculating the seven types of masking coefficients stored beforehand in the ROM 47 will now be described.

In this embodiment, weighting is applied to each term of the evaluation function of the method of least squares described in connection with the prior art, and the way in which the weighting is applied is changed, thereby calculating the seven types of masking coefficients.

Figure 5A:
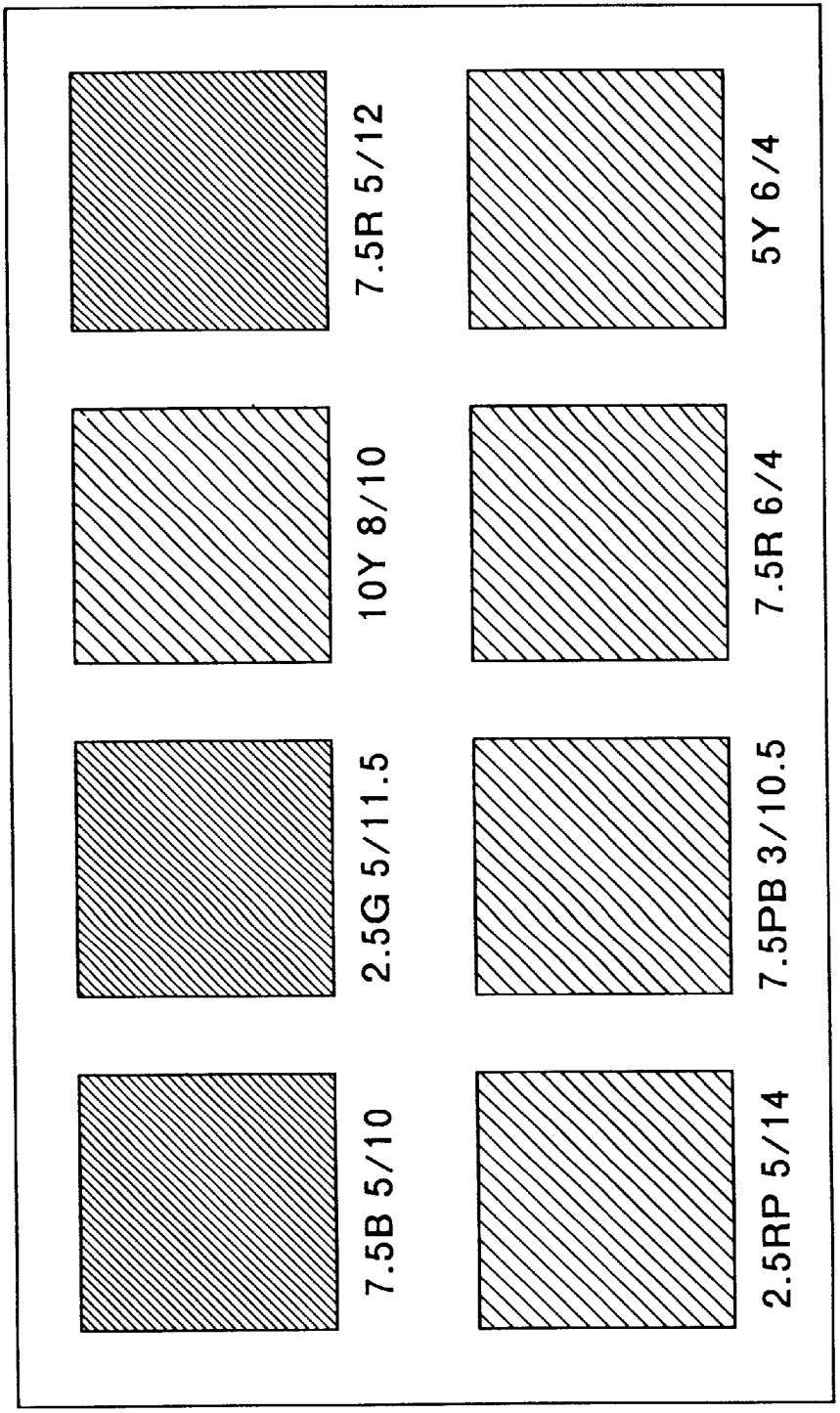
FIGS. 5A–5C are diagrams showing the correspondence between color patches and Munsell color chips.
Figure 5B:
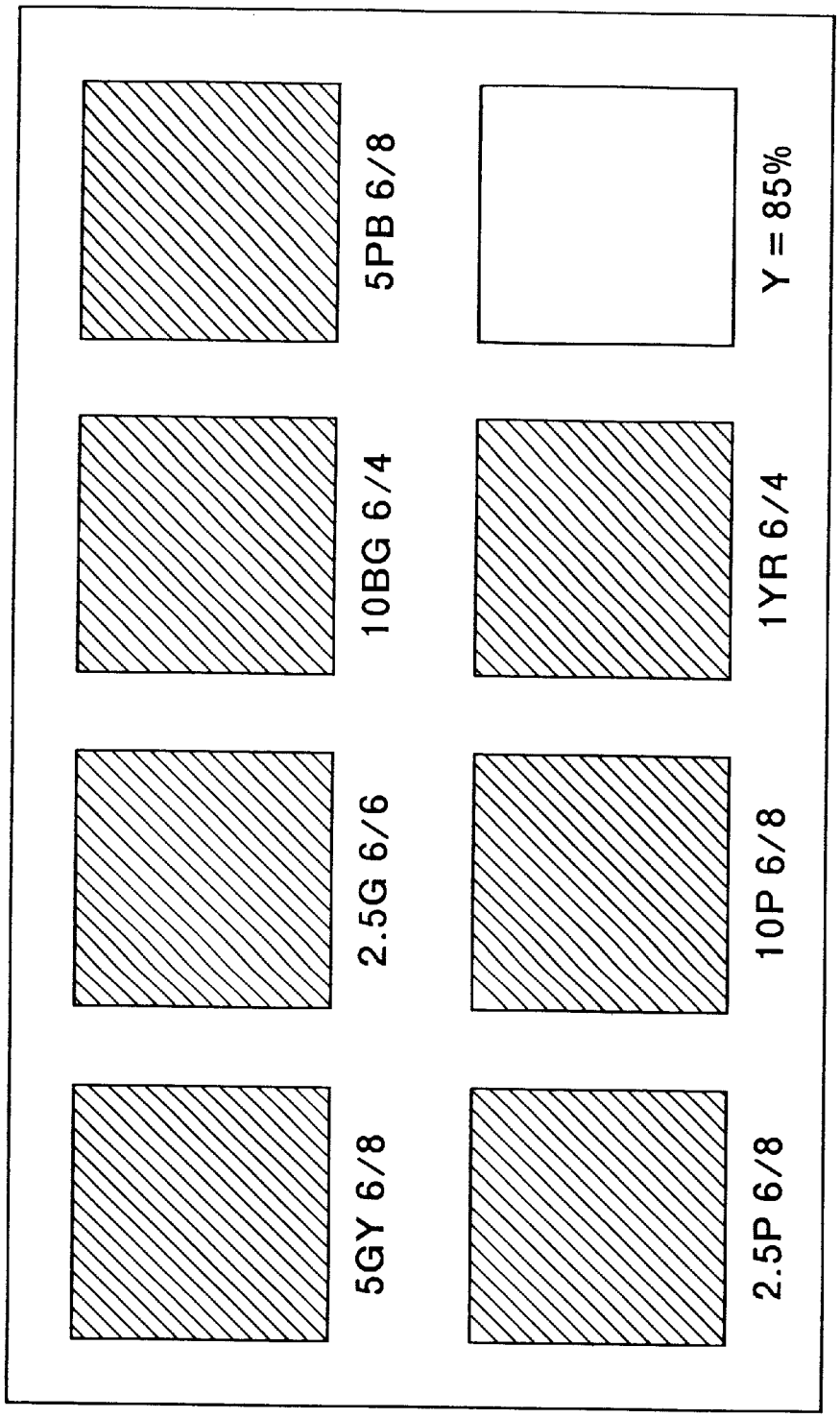
Figure 5C:
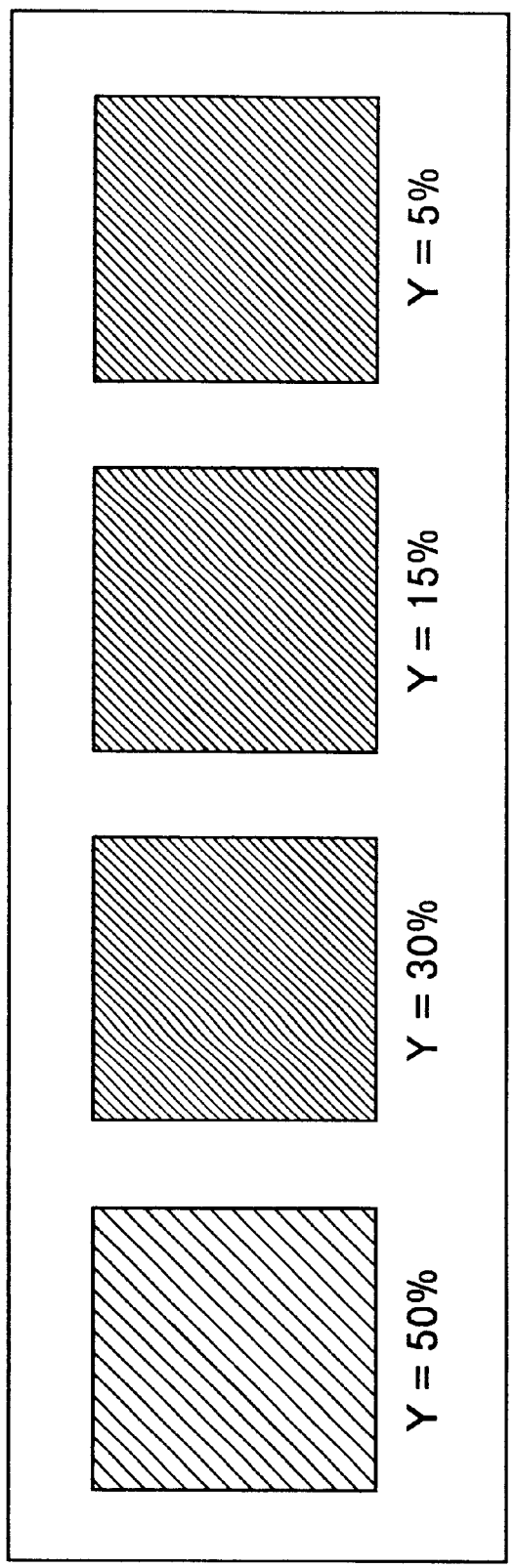

For example, in order to obtain a masking coefficient for which the reproducibility of yellow is especially outstanding, an evaluation function in which the same weighting is applied to all terms, as in the conventional evaluation function for yellow $$\Phi Y = \Delta_{Y1}^2 + \Delta_{Y2}^2 + \ldots + \Delta_{Y20}^2$$

is not employed. Rather, use is made of an evaluation function in which a large weighting is applied to a specific color (here colors of the yellow family) in FIGS. 5A through 5C. That is, use is made of the following evaluation function:

$$\Phi Y = \Delta_{Y1}^2 + \Delta_{Y2}^2 + 10 \cdot Y_3^2 + \ldots + 5 \cdot \Delta_{Y8}^2 + 3 \cdot \Delta_{Y9}^2 + \ldots + 3 \cdot \Delta_{Y15}^2 + \ldots + \Delta Y_{20}^2$$

in which weighting is applied to the colors at 10Y8/10, 5Y6/4, 5GY6/8, 1YR6/4 in terms of the Munsell color chips shown in FIGS. 5A through 5C.

Similarly, with regard also to $\Phi_M$, $\Phi_C$, use is made of evaluation functions in which weighting is applied to the 3rd, 8th, 9th and 15th terms, and the masking coefficient is created, whereby it is possible to obtain a masking coefficient for which the reproducibility of yellow is especially outstanding.

Figure 6:
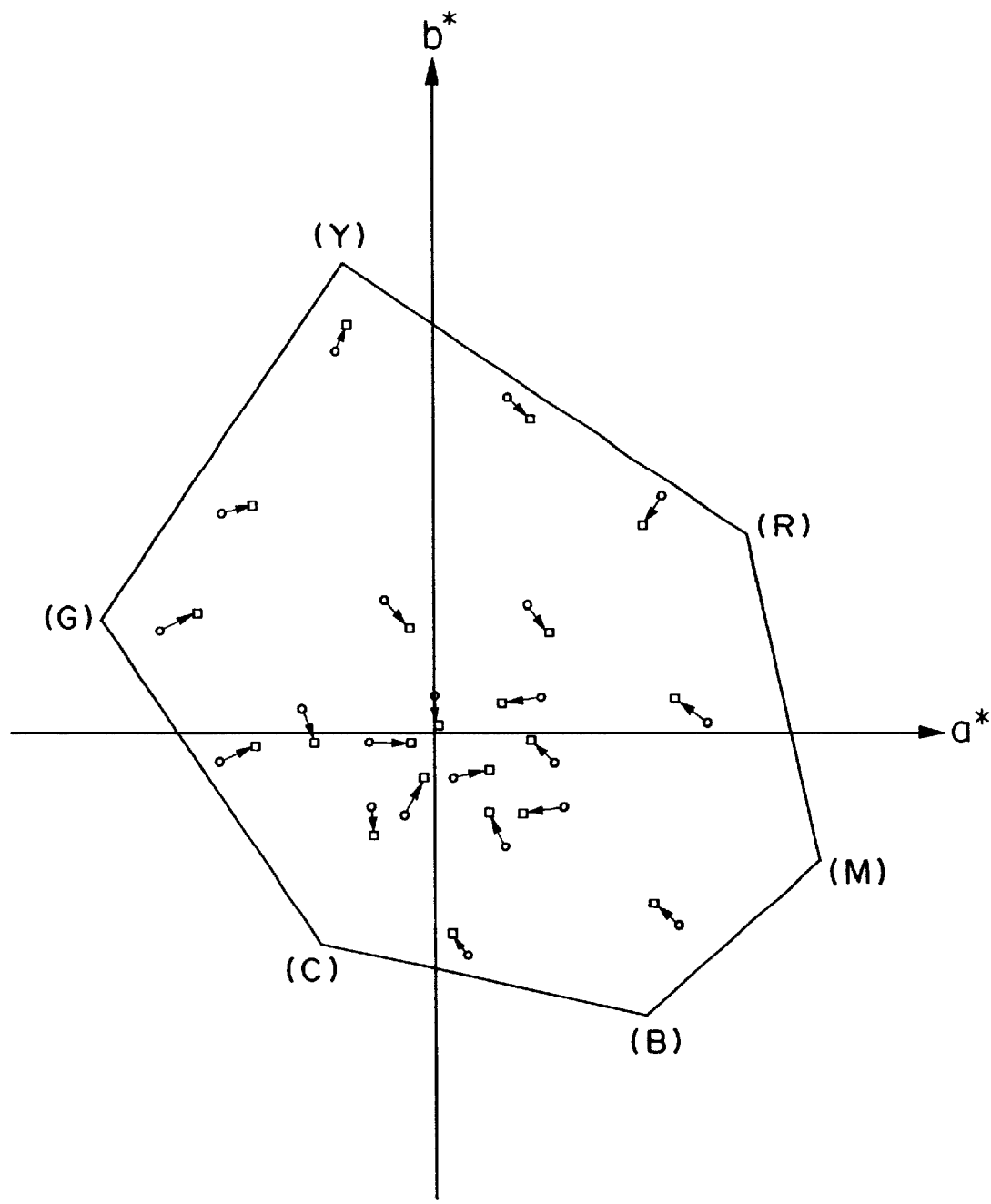
FIG. 6 is a diagram showing color reproduction based upon masking coefficients.
Figure 22:
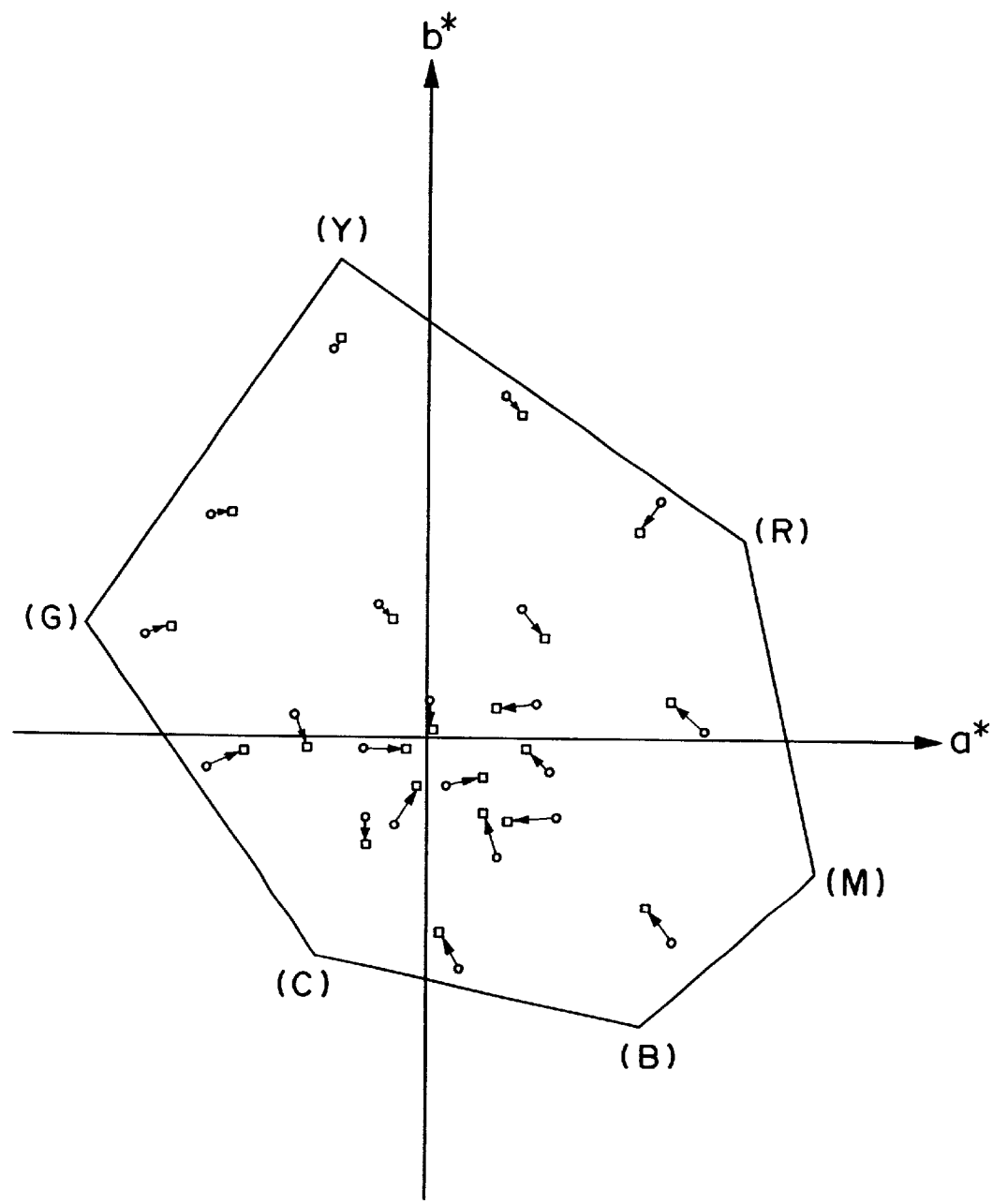
FIG. 22 is a graph illustrating color reproduction based upon masking coefficients for which the reproducibility of yellow is particularly outstanding.

Reproducability in a case where a color correction based upon this masking coefficient has been carried out is as shown in FIG. 22, which should be compared with FIG. 6. It will be understood that though the color reproducibility for colors of the blue family, which is the complementary color of yellow, deteriorates, the color reproducibility for colors of the yellow is especially outstanding.

By changing the way in which the above-described weighting is applied, masking coefficients for which the reproducibility of other colors (magenta, cyan, blue, green and red) is especially outstanding can be obtained.

Though the page memory and CPU are used in order to accumulate the digital data in this embodiment, similar effects can be obtained using an adder.

In accordance with this embodiment, as described above, color distribution in an original image is judged from color information of the original image, and color correcting means are decided based upon the results of the judgment. Accordingly, the color reproducibility for colors having a large distribution in an original image can be improved, and an excellent image can be obtained. In addition, in a case where a copy of a copy is made (an original image is output of a copying machine), a shift in color reproduction can be saved.

A fourth embodiment of the present invention will now be described.

When the characteristic of an original is judged, based upon the color information of the original, to be such that colors are distributed to the same extent in the original or that there is a large gray distribution, as in the foregoing embodiment, it is possible according to this embodiment to further determine which of these two characteristics is the characteristic of the original.

The construction of the apparatus is the same as that shown in FIG. 17, and the flow of data up to the point at which the color-separated digital data is stored in the page memory 49 is the same as that in the foregoing embodiment and need not be described again.

Figure 23A:
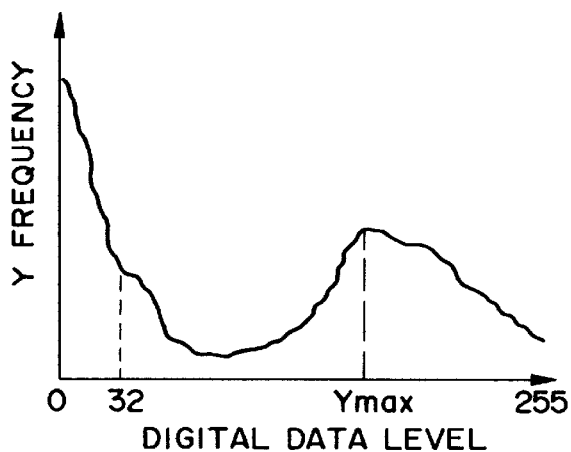
FIGS. 23A–23C are graphs showing frequency distributions for respective colors.
Figure 23B:
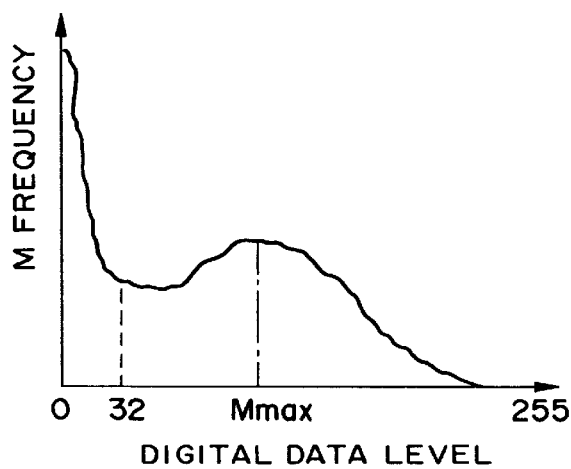
Figure 23C:
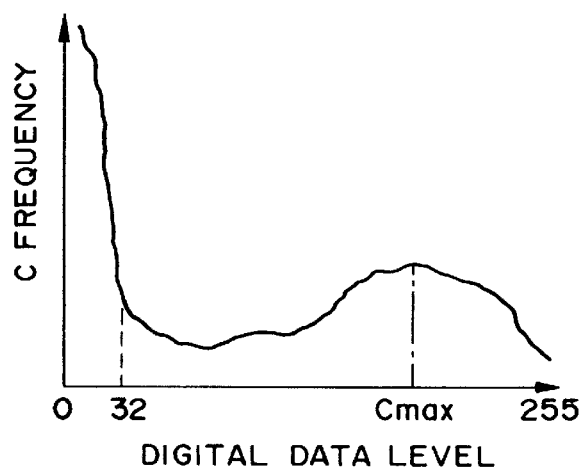

In this embodiment, the CPU 46 reads the data in the page memory 49 and creates histograms of the image data, of the kind shown in FIGS. 23A–23C for every color.

Figure 24:
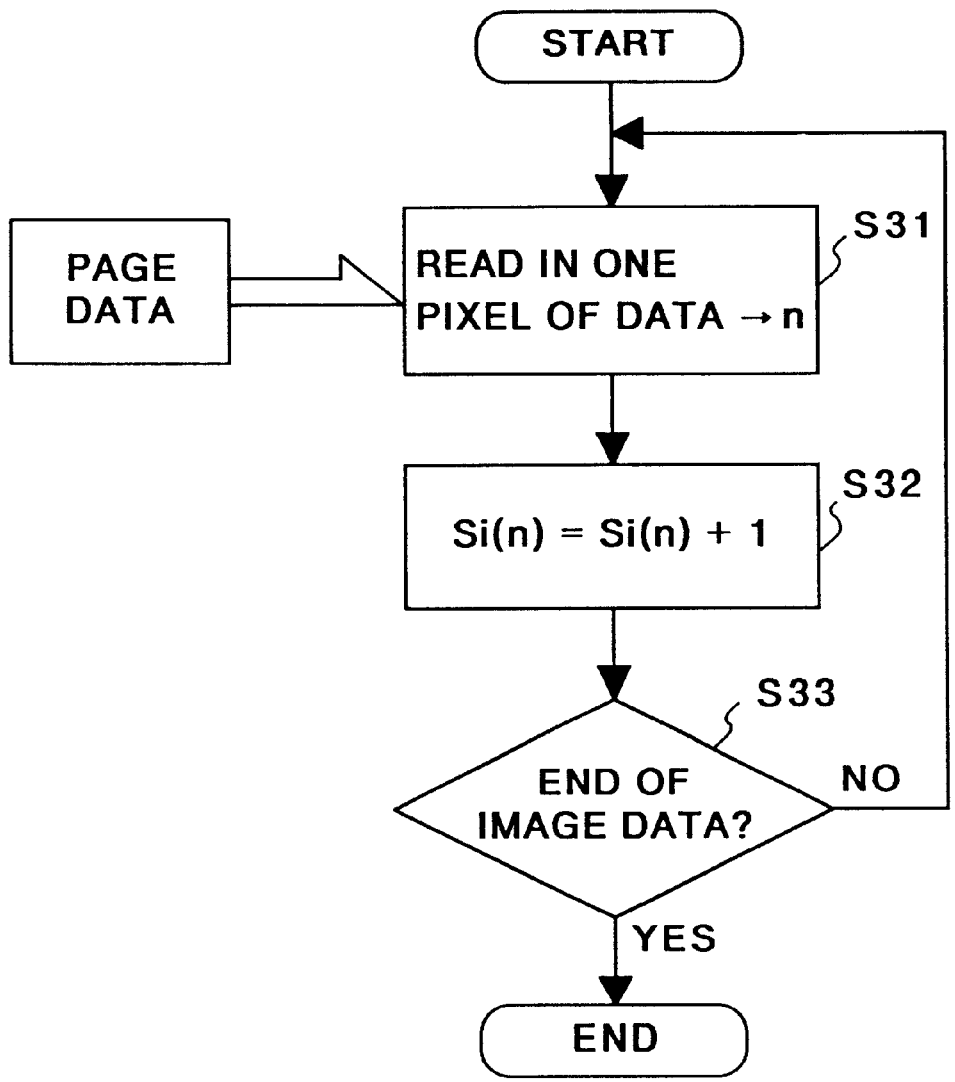
FIG. 24 is a flowchart showing the creation of a frequency distribution.

FIG. 24 is a flowchart illustrating the processing procedure executed by the CPU 46. This processing is executed for each of the colors Y, M, C. Data of one pixel is read out of the page memory 49 at step S31, and the frequency of the n-th level of the digital data of 0–255 is incremented at step S32. When the processing of all image data has ended (YES at step S33), $S_Y(n)$, $S_M(n)$, $S_C(n)$ are created with regard to Y, M, C. The memory of RAM 48 is used when necessary, and the final frequency distributions $S_Y(n)$, $S_M(n)$, $S_C(n)$ (n=0–255) also are stored in the RAM 48. Using these frequency distributions $S_i(n)$ (i=Y, M, C), the CPU 46 calculates the following quantities for each color:

(1) the digital data level indicating the maximum frequency of the histogram; and (2) a cumulative number of the digital data level with regard to all pixels.

The quantities of (1) and (2) mentioned above will now be described in terms of a yellow signal, by way of example.

(1) is calculated as $Y_{max}$ from the histogram of yellow (Y) in FIG. 23. Here the arrangement is such that the maximum frequency is not detected at the low levels (0–32 levels) of the CCD output. That is, since the low-level side of the CCD output corresponds to the white portion of an original, it is arranged so that this is not detected.

(2) is obtained as $$N_Y = \sum_{n=0}^{255} n \times S_Y(n)$$

from the histogram of yellow (Y) in FIG. 23. Similarly, $N_{max}$, $C_{max}$, $N_M$, $N_M$ are generated.

Next, a method of deciding masking coefficients using the results calculated above will be described.

Through a method similar to that of the third embodiment, the extent of the differences involving $N_Y$, $N_M$, $N_C$ are judged. If it is judged that the colors are distributed to the same extent in the original or that there is a large gray distribution, the values of $Y_{max}$, $M_{max}$, $C_{max}$ are judged.

This judgment is carried out by processing similar to the processing procedure shown in FIG. 19. Specifically, it is determined whether two other values are comparatively close to values intermediate $Y_{max}$, $M_{max}$, $C_{max}$. If, as a result, the values of $Y_{max}$, $M_{max}$, $C_{max}$ are equal or approximate one another, the aforementioned results of judgment are narrowed further and it is judged that there is a large gray distribution in the original. If $Y_{max}$, $M_{max}$, $C_{max}$ involve comparatively large differences in terms of their size relationship, then it is judged that the colors are distributed (dispersed) to the same extent in the original.

Masking coefficients are selected based upon the above-described results. Specifically, masking coefficients for which the color reproducibility of gray is particularly outstanding are selected in the former case, and masking coefficients similar to that described in connection with the prior-art example are selected in the later case.

In order to obtain masking coefficients for which the color reproducibility of gray is particularly outstanding, it will suffice to decide the masking coefficients upon applying a large weighting to the gray color in the terms of the evaluation function of the method of least squares. In other words, gray in FIGS. 5A–5C involves the five colors of Y=85%, Y=50%, Y=30%, Y=15%, Y=5% indicated in terms of lightness. It will suffice to decide the masking coefficients using an evaluation function in which weighting is applied to these colors.

By using the foregoing masking coefficients, it is possible to obtain an image having excellent gray reproduction in which colors are not contained in the characters of a created image even with regard to a color original in which there is a large gray distribution in the original image, e.g., an original in which a color photograph is pasted upon a portion of the original having black characters.

<Modification>

A case will now be described in which the color distribution of an original is judged by processing as set forth below, in which $N_Y$, $N_M$, $N_C$ represent the cumulative numbers of each color.

First, let $Na_{11}$ represent the total of the cumulative numbers of each color. $Na_{11}$ is computed in accordance with the equation $N_{a11}=N_B+N_G+N_R$. Next, letting $a_B$, $a_G$, $a_R$ represent the extent of the color components of B, G, R in the original, results in $a_B=N_B/Na_{11}$, $a_G=N_G/Na_{11}$, $a_R=N_R/Na_{11}$ and $a_B+a_G+a_R=1$. This indicates that the ratio of the color components in the original is blue:green:red=$a_B$:$a_G$:$a_R$.

In this modification, the masking coefficients are of three types for which the reproducibility of blue, green and red is excellent. Let these be types 1, 2, 3.

A masking coefficient (M) calculated from the above-mentioned ratios $a_B$, $a_G$, $a_R$ and masking coefficients is calculated as $(M)=a_B \cdot (\text{type 1})+a_G \cdot (\text{type 2})+a_R \cdot (\text{type 3})$ By deciding masking coefficients through the foregoing method, complicated judgments need not be made. In addition, since the basic masking coefficients needed are less than half in comparison with the prior art, ROM memory capacity can be conserved.

In accordance with this embodiment, as described above, the color reproducibility of colors having a large distribution in an original image can be improved to obtain an excellent copy image.

In the above-mentioned embodiment, in order to omit the memory in which an image data is stored, as described in the second embodiment, the original may be scanned by plural scannings (pre-scanning and main-scanning).

In addition, it is not limited to a laser-beam printer as an image forming apparatus, and ink-jet printer, a thermal transfer printer, or a dot printer may be used.

A bubble-jet printer described in U.S. Pat. No. 4,723,129, in which the ink is jetted by making use of the film boiling by the heat energy is included in the ink-jet printer.

As many apparently widely different embodiments of the present invention can be made without departing from the spirit and scope thereof, it is to be understood that the invention is not limited to the specific embodiments thereof except as defined in the appended claims.

What is claimed is:

1. A color-image processing apparatus for converting luminance information based upon an original image into density information and outputting the density information, comprising:

scanning means for scanning the original image and generating luminance information including a plurality of color component data;

detecting means for detecting a distribution of each of the color component data which is obtained during a first scanning of said scanning means;

setting means for setting a conversion condition, being common to the plurality of color component data, based upon a color distribution of each of the color component data detected by said detecting means; and converting means for converting the luminance information, which is obtained during a second scanning of said scanning means, into the density information in accordance with the conversion condition.

2. The apparatus according to claim 1, wherein the distribution of the luminance information is obtained by extracting a frequency of a high-density level range.

3. The apparatus according to claim 1, wherein said detecting means includes a counter for accumulating a frequency of a predetermined density.

4. The apparatus according to claim 1, further comprising:

memory means for storing processing coefficients for performing a conversion by said converting means; and control means for selecting and controlling the processing coefficients stored in said memory means in accordance with the distribution of the luminance information.

5. A color-image processing method comprising the steps of:

scanning an original image and generating first luminance information including a plurality of color component data;

detecting a distribution of each of the color component data;

scanning the original image and generating second luminance information;

setting a conversion condition, being common to the plurality of color component data, based upon a color distribution of each of the color component data detected at said detecting step; and converting the second luminance information into the density information in accordance with the conversion condition.

6. A color-image processing apparatus comprising:

storage means for storing plural color correction conditions suitable for a predetermined color;

input means for inputting a plurality of color component signals representing a color original;

detecting means for detecting a distribution of the color original;

selecting means for selecting a color correction condition according to the detected distribution from among color correction conditions stored in said storage means; and correcting means for correcting the color component signals representing the color original based upon the selected color correction condition.

7. The apparatus according to claim 6, wherein the color correction conditions are matrix coefficients.

8. The apparatus according to claim 6, wherein said detecting means detects a color having a large distribution in the color original as a representative color in the predetermined color, and said selecting means selects a color correction condition corresponding to the detected representative color.

9. The apparatus according to claim 6, wherein said storing means stores a color correction condition which is obtained such that an average of reproducibility errors of each of the plurality of different colors is minimized, and said selecting means selects the color correction condition in a case where said detecting means detects that various colors are included in siad color original.

10. The apparatus according to claim 6, further comprising image forming means for forming an image based on density information.

11. The apparatus according to claim 6, further comprising image forming means for forming an image based on the corrected color component signals.

12. The color-image processing method comprising the steps of:

storing plural color correction conditions suitable for a predetermined color in a storage means;

inputting a plurality of color component signals representing a color original;

detecting a distribution of the color original;

selecting a color correction condition according to the detected distribution from among color correction conditions stored in said storage means; and correcting the color component signals representing the color original based upon the selected color correction condition.

* * * * *

UNITED STATES PATENT AND TRADEMARK OFFICE
CERTIFICATE OF CORRECTION

PATENT NO.    : 6,546,131 B1
DATED         : April 8, 2003
INVENTOR(S)   : Yoshito Mizoguchi et al.

It is certified that error appears in the above-identified patent and that said Letters Patent is hereby corrected as shown below:

Column 3,
Line 36, "in in" should read -- in --.

Column 4,
Line 54, "$\sum M'_i M'_i$" should read --$\sum Y'_i M'_i$--.

Column 6,
Line 41, "diagram" should read -- diagram of --.

Column 8,
Line 18, "$D_x = -\log \frac{x}{255}$     (2)" should read --$D_n = \frac{255}{D_b - D_a} \times \left(-\log \frac{n}{255}\right)$     (1)--;

Line 37, "$D_n = \frac{255}{D_b - D_a} \times \left(-\log \frac{n}{255}\right)$     (1)" should read --$D_x = -\log \frac{x}{255}$     (2)--.

Column 10,
Line 35, "9B" should read -- 9B, --; and
Line 36, "32Ba" should read -- 32B, -- and "29B" should read -- 29B, --.

Column 16,
Line 30, "siad" should read -- said --.

Signed and Sealed this

Sixth Day of April, 2004

JON W. DUDAS
*Acting Director of the United States Patent and Trademark Office*